(12) United States Patent
Blackburn et al.

(10) Patent No.: US 11,422,089 B2
(45) Date of Patent: *Aug. 23, 2022

(54) METHOD FOR MEASURING OPTICAL CHARACTERISTICS OF A TRANSPARENT ARTICLE

(71) Applicant: Transitions Optical, Ltd., Tuam (IE)

(72) Inventors: Forrest R. Blackburn, Monroeville, PA (US); Joshua Hazle, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 113 days.

This patent is subject to a terminal disclaimer.

(21) Appl. No.: 16/957,892

(22) PCT Filed: Dec. 28, 2017

(86) PCT No.: PCT/EP2017/084710
§ 371 (c)(1),
(2) Date: Jun. 25, 2020

(87) PCT Pub. No.: WO2019/129348
PCT Pub. Date: Jul. 4, 2019

(65) Prior Publication Data
US 2021/0055217 A1    Feb. 25, 2021

(51) Int. Cl.
*G01N 21/59* (2006.01)
*G01M 11/02* (2006.01)
(Continued)

(52) U.S. Cl.
CPC ......... *G01N 21/59* (2013.01); *G01M 11/0285* (2013.01); *G01N 21/958* (2013.01);
(Continued)

(58) Field of Classification Search
CPC ........ B01J 21/18; B01J 23/34; B01J 35/1028; B01J 37/04; B01J 37/06; G01M 11/0285;
(Continued)

(56) References Cited

U.S. PATENT DOCUMENTS 6,084,662 A    7/2000  Seaburn
7,560,056 B2   7/2009  Van Gemert et al.
(Continued)

FOREIGN PATENT DOCUMENTS

DE   102013100809 A1   7/2014
EP      2390905 A1    11/2011
(Continued)

OTHER PUBLICATIONS

Harris et al., "Light Transmission of Hydrogel Contact Lenses", American Journal of Optometry & Physiological Optics, 1978, pp. 93-96, vol. 55, No. 2.
(Continued)

*Primary Examiner* — Tri T Ton
(74) *Attorney, Agent, or Firm* — The Webb Law Firm

(57) ABSTRACT

A method of determining the transmittance of a transparent article (250) includes the steps of obtaining a measurement of a first intensity of electromagnetic radiation reflected or emitted by reference surface (80) with an intensity measuring device (400), positioning the transparent article (250) over the reference surface (80), obtaining a measurement of a second intensity of electromagnetic radiation transmitted through the transparent article (250) that is reflected or emitted by a region (110) of the reference surface (80) that is covered by the transparent article (250) with the intensity measuring device (400); and calculating the transmittance using the measurements of the first intensity and the second intensity.

16 Claims, 10 Drawing Sheets

(51) Int. Cl.
  *G01N 21/958* (2006.01)
  *G02C 7/04* (2006.01)
  *G02C 7/10* (2006.01)

(52) U.S. Cl.
  CPC ............... *G02C 7/04* (2013.01); *G02C 7/102* (2013.01); *G01N 2021/9583* (2013.01); *G01N 2201/063* (2013.01)

(58) Field of Classification Search
  CPC ..... G01N 2021/598; G01N 2021/9583; G01N 21/59; G01N 21/958; G01N 2201/063; G02B 1/043; G02C 7/04; G02C 7/102; H01G 11/30
  USPC ........................................................ 356/432
  See application file for complete search history.

(56) References Cited

U.S. PATENT DOCUMENTS

| | | | |
|---|---|---|---|
| 2003/0043376 A1* | 3/2003 | Kishikawa | G02B 27/108 356/432 |
| 2006/0227287 A1 | 10/2006 | Molock et al. | |
| 2011/0292373 A1 | 12/2011 | Witting et al. | |
| 2020/0363292 A1* | 11/2020 | Hazle | G02C 7/102 |

FOREIGN PATENT DOCUMENTS

| | | |
|---|---|---|
| JP | S5720636 A | 2/1982 |
| JP | 2000304653 A | 11/2000 |

OTHER PUBLICATIONS

Quesnel et al., "Spectral Transmittance of UV-Absorbing Soft and Rigid Gas Permeable Contact Lenses", Optometry and Vision Science, 1995, pp. 2-10, vol. 72, No. 1.
Soares, "Introduction to Optical Characterization of Materials", Practical Materials Characterization, 2014, pp. 43-92, Springer Science+Business Media, New York, USA.

* cited by examiner

METHOD FOR MEASURING OPTICAL CHARACTERISTICS OF A TRANSPARENT ARTICLE

CROSS-REFERENCE TO RELATED APPLICATION

This application is the United States national phase of International Application No. PCT/EP2017/084710 filed Dec. 28, 2017, the disclosure of which is hereby incorporated by reference in its entirety.

BACKGROUND OF THE INVENTION

Field of the Invention

This invention relates to a method and measurement system for determining optical characteristics of a transparent article, such as an optical element, for example, a photochromic ophthalmic device, under real-world and/or laboratory conditions.

Technical Considerations

Optical elements that absorb electromagnetic radiation in the visible region of the electromagnetic spectrum are used in a variety of articles, such as ophthalmic lenses for spectacles and sunglasses, and for contact lenses. Electromagnetic radiation absorbing ophthalmic lenses improve the viewing comfort of the wearer and enhance the wearer's ability to see in bright conditions. Examples of electromagnetic radiation absorbing ophthalmic lens include fixed tint ophthalmic lenses and photochromic ophthalmic lenses.

Photochromic lenses change tint in response to certain wavelengths of electromagnetic radiation. Photochromic lenses provide the wearer with improved vision and comfort when exposed to bright light conditions but return to a non-absorbing or lesser-absorbing state in low light conditions. Photochromic lenses provide comfort and ease of viewing over a range of lighting conditions and eliminate the need for switching between pairs of spectacles when moving between indoor/low light and outdoor/bright light locations.

Known methods for testing or quantifying the amount of light transmitted by ophthalmic lenses, such as photochromic ophthalmic lenses, utilize a conventional optical bench under laboratory conditions. The photochromic lens is activated, typically by exposure to ultraviolet radiation, and is affixed to the optical bench for testing. While optical benches are well-suited for laboratory conditions, they may not provide an accurate determination of the optical characteristics and/or aesthetic characteristics of the photochromic lens under real-world conditions, such as when actually being worn under ambient lighting conditions. The color or tint/darkness of the activated photochromic lens can appear different when actually being worn by a user under real-world conditions compared to when the lens is measured on an optical bench under laboratory conditions. Also, the perceived aesthetics of the photochromic lens can differ when actually being worn due to the varying color and shading characteristics of the human eye.

The transmission of light by photochromic lenses changes based on the amount and duration of actinic radiation received. If the photochromic lens were first activated by a wearer under ambient conditions and then transferred to a laboratory optical bench for measurement, the level of activation of the photochromic lens may be different between the time it is activated and the time that it has been affixed to the optical bench for measurement. Existing methods of maintaining activation under laboratory conditions, such as exposing the photochromic lenses to Xenon arc lamps, may not accurately recreate real-world conditions.

The ability to determine optical characteristics of an ophthalmic lens, e.g., an activated photochromic ophthalmic lens, outside of a conventional laboratory environment has several applications including in quality control and in marketing. Testing photochromic ophthalmic lenses under real-world conditions provides useful data on the comfort and reliability experienced by a wearer. Additionally, the ability to accurately determine real-world characteristics of photochromic ophthalmic lenses may provide purchasers with a quantifiable or qualifiable basis by which to judge various photochromic ophthalmic lenses for use in their geographic location or for their desired purpose.

It further is preferable to determine optical characteristics over the area of transparent articles, such as ophthalmic devices, quickly as it allows for the identification of defects in the ophthalmic devices. For example, variations in optical densities between various portions of an ophthalmic device may be identified according to the system and method disclosed herein. Additionally, a photochromic gradient of a photochromic ophthalmic device may quickly be determined as well.

Thus, it would be desirable to provide a method and/or system for measuring optical characteristics of transparent articles, such as a photochromic ophthalmic device, under real-world conditions and/or laboratory conditions. A further need exists for the method and/or system to be portable.

SUMMARY OF DISCLOSURE

A method for determining the transmittance of electromagnetic radiation through a transparent article comprises: measuring a first intensity of electromagnetic radiation reflected or emitted by a reference surface; positioning a transparent article over a portion of the reference surface; measuring a second intensity of electromagnetic radiation transmitted through the transparent article that is reflected or emitted by a region of the reference surface that is covered by the transparent article; and calculating the transmittance of electromagnetic radiation through the transparent article using the measurements of the first intensity and the second intensity.

A method for determining the transmittance of electromagnetic radiation through a transparent article comprises: positioning a non-activated transparent article over a portion of a reference surface; measuring a first intensity of electromagnetic radiation reflected or emitted by a region of the reference surface covered by the non-activated transparent article; activating the transparent article on the reference surface; measuring a second intensity of electromagnetic radiation transmitted through the transparent article that is reflected or emitted by a region of the reference surface that is covered by the activated transparent article; and calculating the transmittance of electromagnetic radiation through the transparent article using the measurements of the first intensity and the second intensity.

A method for determining the transmittance of electromagnetic radiation through a transparent article: measuring a first intensity of electromagnetic radiation transmitted through the transparent article that is reflected or emitted by a region of the reference surface covered by an activated transparent article; measuring a second intensity of electromagnetic radiation reflected or emitted by a region of the reference surface that is not covered by the transparent article; converting the first and second measurements to CIE color coordinates; and calculating the transmittance of electromagnetic radiation through the transparent article using the difference in the CIE color coordinates.

The transparent article can be in direct contact with the ocular surface or can be spaced from the reference surface.

The measurements of the first and second intensities can be made using a photo imaging device.

The electromagnetic radiation can be one or more wavelengths of visible light or one or more ranges of wavelengths of visible light.

The transparent article can be an optical element, for example an ophthalmic device, such as a photochromic ophthalmic device. The photochromic ophthalmic device can be a photochromic RGP contact lens.

A method for determining the transmittance of a photochromic ophthalmic device at a desired level of activation, comprises: selecting a desired wavelength range of electromagnetic radiation; selecting a desired level of activation of the photochromic ophthalmic device; exposing the photochromic ophthalmic device to actinic radiation at the desired wavelength range until the photochromic ophthalmic device reaches the desired level of activation; maximizing visibility of a region of a sclera of an eye; taking a first image of the region of the sclera with an imaging device, wherein the imaging device is configured to record light intensity data over the selected wavelength range; recording a first set of electromagnetic radiation intensity data for the selected wavelength range taken from the first image; covering or overlaying the region of the sclera with the activated photochromic ophthalmic device; taking a second image of the region of the sclera with the imaging device; recording a second set of electromagnetic radiation intensity data for the selected wavelength range taken from the second image; entering the first and second sets of data into a database; and using a processor to determine the transmittance of the photochromic ophthalmic device.

DESCRIPTION OF THE PREFERRED EMBODIMENTS

Figure 1A:
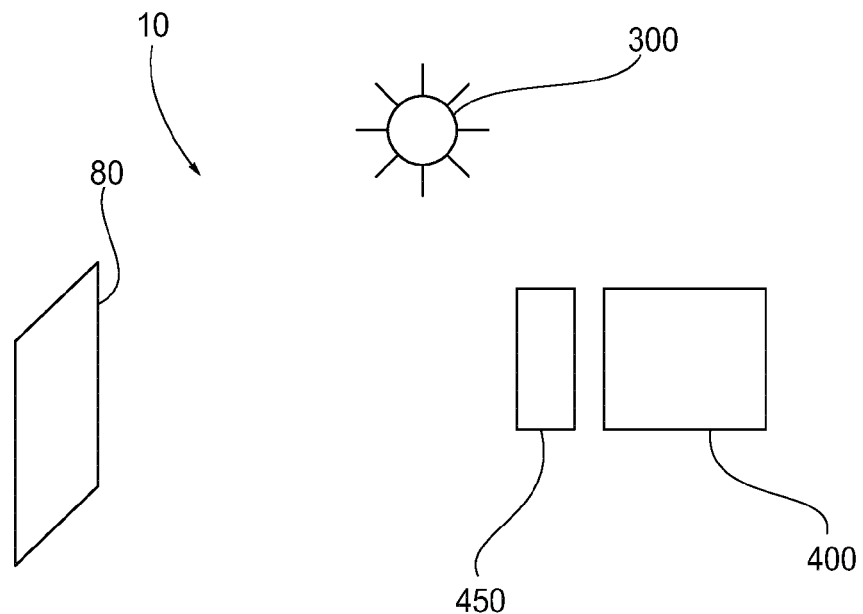
FIG. 1A is a side, schematic view of an exemplary intensity measurement system comprising an intensity measuring device for measuring electromagnetic radiation intensity data reflected from a reference surface.

As used in the specification and the claims, the singular form of "a", "an", and "the" include plural referents, unless the context clearly dictates otherwise.

Spatial or directional terms, such as "left", "right", "up", "down", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

Use of the terms "covered by" or "covers" with respect to the positional relationship between examples of a reference surface and examples of a transparent article means in direct contact. For example, a region of an ocular surface covered by an ophthalmic device means that the ophthalmic device is in direct contact with the ocular surface. It is to be understood that the terms "direct contact" and "directly on" also include conditions where a tear film is present between the ophthalmic device and the ocular surface.

Similarly, use of the terms "over," "overlay," and "overlaid" with respect to the positional relationship between examples of a reference surface and examples of a transparent article means not in direct contact. For example, an ophthalmic device "over" an ocular surface means that the ophthalmic device is spaced from the ocular surface.

The term "uncovered" or "not covered" used with respect to the positional relationship between examples of a reference surface and examples of a transparent article means that the reference surface is neither "covered" nor "overlaid" by a transparent article from the frame of reference of an imaging device.

The terms "polymer" or "polymeric" include oligomers, homopolymers, copolymers, polymer blends (i.e., mixtures of homopolymers or copolymers), and terpolymers, e.g., polymers formed from two or more types of monomers or polymers.

The term "ultraviolet radiation" means electromagnetic radiation having a wavelength in the range of 100 nm to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 1,000,000 nm.

All documents referred to herein are "incorporated by reference" in their entirety.

By "at least" is meant "greater than or equal to". By "not greater than" is meant "less than or equal to".

Wavelength values, unless indicated to the contrary, are in nanometers (nm).

The term "includes" is synonymous with "comprises".

The terms "actinic radiation" and "actinic light" mean electromagnetic radiation capable of causing a response in a material, such as transforming a photochromic material from one activation state to another activation state.

The term "photochromic" means having an absorption spectrum for at least visible radiation that varies in response to absorption of at least actinic radiation.

When referring to different conditions, the terms "first", "second", etc., are not intended to refer to any particular order or chronology but instead refer to different conditions or properties. For illustration, the first state and the second state of a photochromic ophthalmic device can differ with respect to at least one optical property, such as to the absorption or linear polarization of visible and/or ultraviolet (UV) radiation. For example, a photochromic ophthalmic device can be clear in the first state and colored in the second state. Alternatively, the photochromic ophthalmic device can have a first color in the first state and a second color in the second state.

The term "optical" means pertaining to or associated with light and/or vision. For example, an optical article or element or device can be chosen from ophthalmic articles, elements and devices, display articles, elements and devices, windows, mirrors, and active and passive liquid crystal cell articles, elements and devices.

The term "ophthalmic" means pertaining to or associated with the eye and vision. Examples of ophthalmic articles or devices include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, soft contact lenses, hard contact lenses, intraocular lenses, overlay lenses, ocular inserts, optical inserts, magnifying lenses, protective lenses or visors, and rigid gas permeable ("RGP") lenses. These devices can provide optical correction, wound care, drug delivery, diagnostic functionality, cosmetic enhancement or effect, or a combination of these properties. Non-limiting examples of photochromic ophthalmic devices may be found in U.S. Pat. No. 7,560,056 to Van Gemert et al. and U.S. Patent Application Publication No. 2006/0227287 to Molock et al. Ophthalmic articles or devices are subsets of transparent articles.

The term "rigid gas permeable" or "RGP" lenses means contact lenses having a water content of less than five percent (5%) and formed entirely from rigid polymer materials which allow oxygen to pass through the lenses to the cornea and are capable of maintaining their shape in relationship to the eye; embodiments of such lenses may be manufactured by a lathing process.

The term "fixed tint" means having colorants that are non-photosensitive, i.e., do not physically or chemically respond to electromagnetic radiation with regard to the visually observed color thereof.

The term "transparent" means the material has the property of transmitting light without appreciable scattering so that objects lying beyond are visible. A transparent article consistent with this disclosure may possess photochromic properties, and may become "activated" with respect to a desired wavelength range of light. Unless explicitly stated otherwise, or otherwise indicated by context, any reference to a "transparent article" herein includes ophthalmic devices as defined herein as a subset.

The term "activated" means that the optical device has been exposed to conditions, such as actinic radiation, and for a sufficient period of time, such that the optical device shifts from a first activation state to a second activation state with respect to at least one optical property, such as the absorption or linear polarization of visible and/or ultraviolet (UV) radiation.

The term "desired level of activation" may be a quantitative or qualitative determination. A desired level of activation of a photochromic ophthalmic device may be the level of activation that that device has reached by being exposed to ambient or directed light in a particular environment (wavelength or range of wavelengths) for a selected period of time.

By CIE color coordinates (e.g., X, Y, Z) is meant coordinates in accordance with the CIE XYZ color system specified by the International Commission on Illumination, including the CIE color matching functions xyz. CIE color coordinates may be in accordance with CIE XYZ 1931, 1664, and/or 2004 formats.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

FIG. 1A is a schematic representation of a measurement system 10 of the invention. The measurement system 10 includes a reference surface 80, a light source 300, and an imaging device 400.

The light source 300 emits electromagnetic radiation in one or more wavelengths or one or more ranges of wavelengths. The electromagnetic radiation can be visible light. The light source 300 may also emit electromagnetic radiation in one or more other spectra of electromagnetic radiation, such as the infrared (IR) and/or ultraviolet (UV) spectra. Although not shown in the Figure, multiple light sources 300 can be used. If a plurality of light sources 300 is present, the light sources 300 can emit the same wavelength or wavelength range of electromagnetic radiation, or some of the light sources 300 may emit different wavelengths or ranges or wavelengths of electromagnetic radiation than other of the light sources 300. Examples of the light source 300 include the sun, in which case the electromagnetic radiation would be ambient outdoor light. Or, the light source 300 can be an artificial light source, such as an incandescent light bulb, florescent light, compact florescent light, or any other light source that emits electromagnetic radiation in a desired spectrum.

The reference surface 80 can be a natural or artificial surface. The reference surface 80 may be configured to have uniform optical features over the surface, such as color or reflectance. The reference surface 80 may be comprised of a two-dimensional field of a preferred and/or uniform color. However, the reference surface may be three dimensional.

With reference to FIG. 1A, electromagnetic radiation, e.g., visible light, emitted from the light source 300 is reflected off of one or more regions of the reference surface 80. The imaging device 400 captures image data of the electromagnetic radiation reflected from the reference surface 80. The imaging device 400 is an intensity detection device and measures the intensity of electromagnetic radiation reflected from one or more portions of the reference surface 80. The intensity data, as a function of position, can be included in the image data taken by the imaging device 400. It is not necessary for the imaging device 400 to have a high resolution in order to measure the intensity of electromagnetic radiation reflected by the reference surface 80. However, it is preferable that the imaging device 400 possess good photometric linearity. It is further preferable that the imaging device 400 possess a high dynamic range. Examples of the imaging device 400 include digital cameras, charge-coupled devices (CODs), complementary metal-oxide semiconductor (CMOS) sensors, photodiode arrays, photomultiplier arrays, or a single sensor (1×1 array) with optics to focus in on any given area size. An additional example of an imaging device 400 is a hyperspectral imager, wherein the image sensor at each pixel may take data over the entire spectrum of visible light, not just a narrowed band due to filters. The imaging device 400 may take images that are in color or black and white. An example of a suitable imaging device 400 to serve as an intensity measuring device is a model AVT F-145 B/C Stingray camera, commercially available from Allied Vision Technologies of Exton, Pa. Images taken using a High Dynamic Range ("HDR") function also may be used, provided that exposure times and dark values are known, and assuming a linear relationship between exposure time and measured intensity value.

Image data, including data on light intensity and position, can be stored in the internal memory of the imaging device 400. Alternatively, image data can be stored in a removable or external memory, or in any other manner known in the art.

The imaging device 400 is configured to take image data that includes intensity data of one or more selected wavelengths or one or more wavelength ranges of electromagnetic radiation. For example, the imaging device 400 can be configured to take image data that includes intensity data of one or more selected wavelengths or one or more wavelength ranges of electromagnetic radiation within the range of 1 nm to 1,000 nm. For example, the imaging device 400 can be configured to take image data that includes intensity data of one or more selected wavelengths or one or more wavelength ranges of visible light. For example, the imaging device 400 may take data on the intensity of electromagnetic radiation in the red, green, and blue ranges. Alternatively or additionally, the imaging device 400 may take intensity data of electromagnetic radiation in the cyan, yellow, green, and/or magenta ranges. Other wavelength ranges also may be used. It will be understood by a skilled artisan that various manufacturers and imaging devices define these color ranges differently, and that specific wavelengths or wavelength ranges for each color, and some ranges, may overlap. Exemplary ranges for red, green, and blue are 635±20 nm, 555±20 nm, and 460±20 nm, respectively. Any range or combination of wavelength ranges in the visible light spectrum, which includes wavelengths between approximately 380-780 nm, may be used.

Specific wavelength ranges of visible light for which data may be taken can be chosen. These wavelength ranges may correspond to the colors of specific photochromic dyes present in the optical element, such as a photochromic ophthalmic device, to be tested. The wavelengths can be any combination of wavelengths, and can be defined by the use of a filter. A filter 450 corresponding to a selected or desired range or ranges of wavelengths of electromagnetic radiation, e.g., visible light, may be placed between the reference surface 80 and the imaging device 400. The filter 450 limits the light entering the imaging device 400 to the desired wavelength or range of wavelengths. The filter 450 may be placed over a lens of the imaging device 400. Examples of the filter 450 include a band pass filter, a short pass filter, a long pass filter, or other filters known in the art. The filter 450 may be a notch filter centered on one or more wavelengths of electromagnetic radiation in any desired wavelength range. The notch filter may transmit a narrow range of wavelengths of electromagnetic radiation centered on the desired wavelength, while blocking the rest of the spectrum of visible light. The filter 450 may be a three-notch filter. The filter 450 may be a three-notch filter with the notches centered at 635±20 nm, 555±20 nm, and 460±20 nm, respectively. Measurements of intensity values may be made over the same range of wavelengths of light. The filter 450 may be chosen to correspond to, or differ from, the color of the reference surface 80.

Figure 1B:
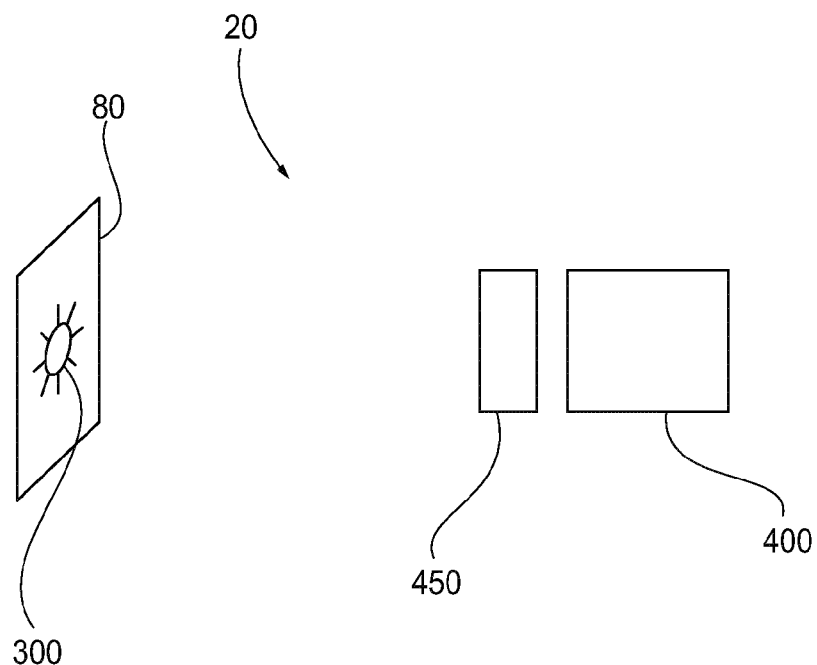
FIG. 1B is a side, schematic view of another exemplary intensity measurement system comprising an intensity measuring device for measuring electromagnetic radiation intensity data emitted from a reference surface.

FIG. 1B is a schematic depiction of an exemplary measurement system 20 of the invention wherein the reference surface 80 includes a light source 300. Non-limiting examples of such a reference surface 80 include a backlit sheet of fabric or plastic, or an LED array. A reference surface 80 that includes a light source 300 may be diffusely lit. An exemplary reference surface depicted in FIG. 1B may include a diffuse white-light LED system. The light source comprised by the reference surface 80 may be the sole light source of the system 20. However, while not shown in the Figure, it is to be understood that the system 20 may include additional light sources 300 that are not comprised by the reference surface 80.

Figure 1C:
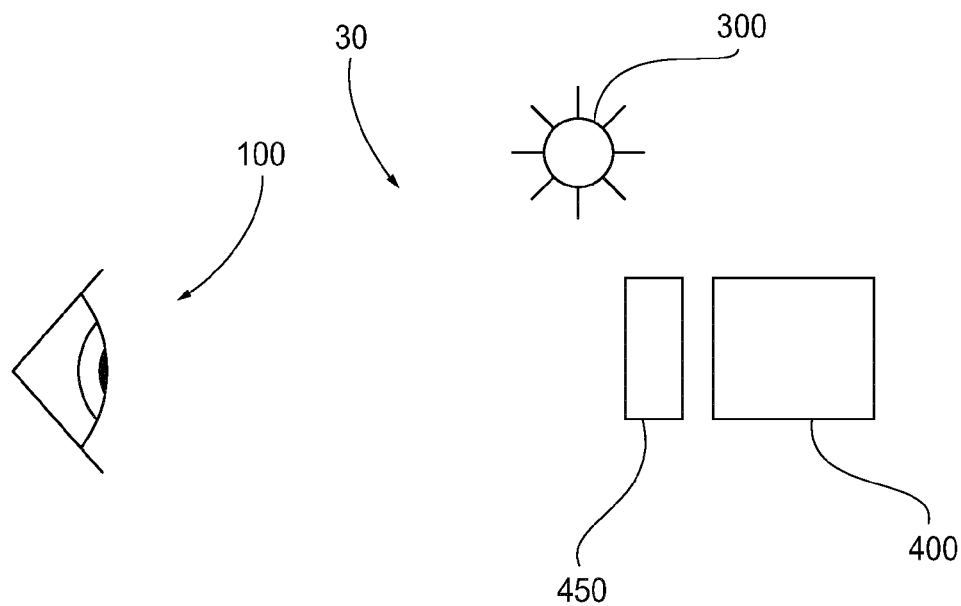
FIG. 1C is a side, schematic view of yet another exemplary intensity measurement system comprising an intensity measuring device for measuring electromagnetic radiation intensity data reflected from an ocular surface.

FIG. 1C is a schematic depiction of an exemplary measurement system 30 of the invention wherein the reference surface 80 comprises an ocular surface 100. The ocular surface 100 can be an artificial surface that approximates one or more aspects of the human eye, such as the temperature, moisture content, reflectance, color, transmittance, or other physical or optical properties of the human eye. For example, the ocular surface 100 can be a three-dimensional polymeric article having regions that approximate one or more features or characteristics of the human eye, such as the sclera 120, pupil 130, and iris 140. The ocular surface 100 can be the surface of a human eye. The ocular surface 100 can be the surface of an animal eye. The ocular surface 100 may comprise an artificial, diffusely-lit surface.

With reference to FIGS. 1A-1B, a first measurement of the intensity of electromagnetic radiation reflected or emitted from the surface 80 is taken with the imaging device 400. The first measurement can be taken on a selected portion of the reference surface 80. For example, the first measurement can be taken over one or more regions 110 of the reference surface 80, as shown in FIG. 2C. Similarly, with reference to FIG. 1C, the first measurement of the intensity of electromagnetic radiation reflected from the ocular surface 100, may be taken with the imaging device 400.

Figure 2A:
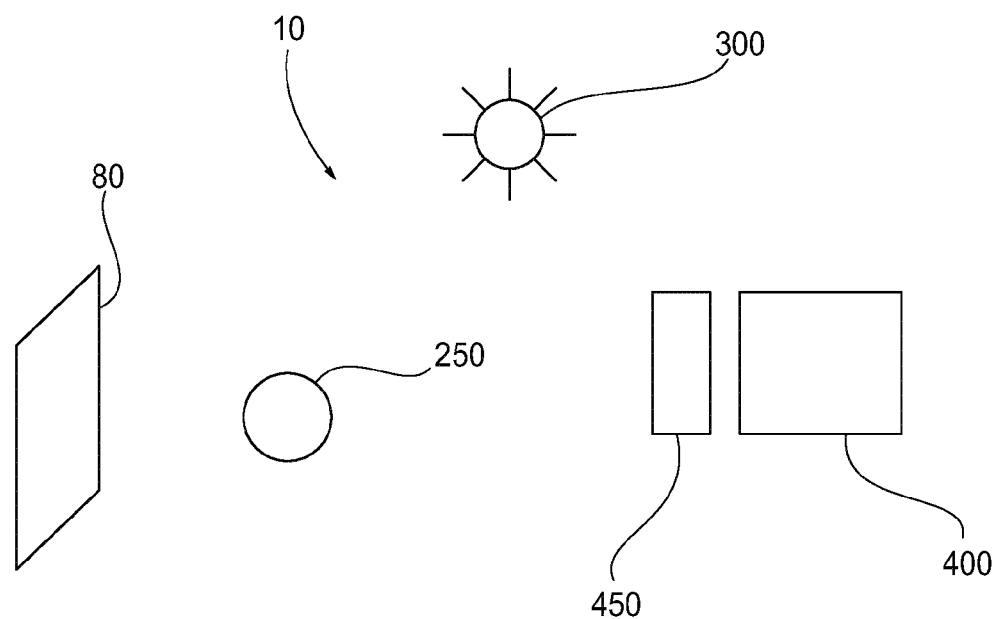
FIG. 2A is a side, schematic view of an intensity measurement system according to FIG. 1A, and including a schematic representation of a transparent article.
Figure 2B:
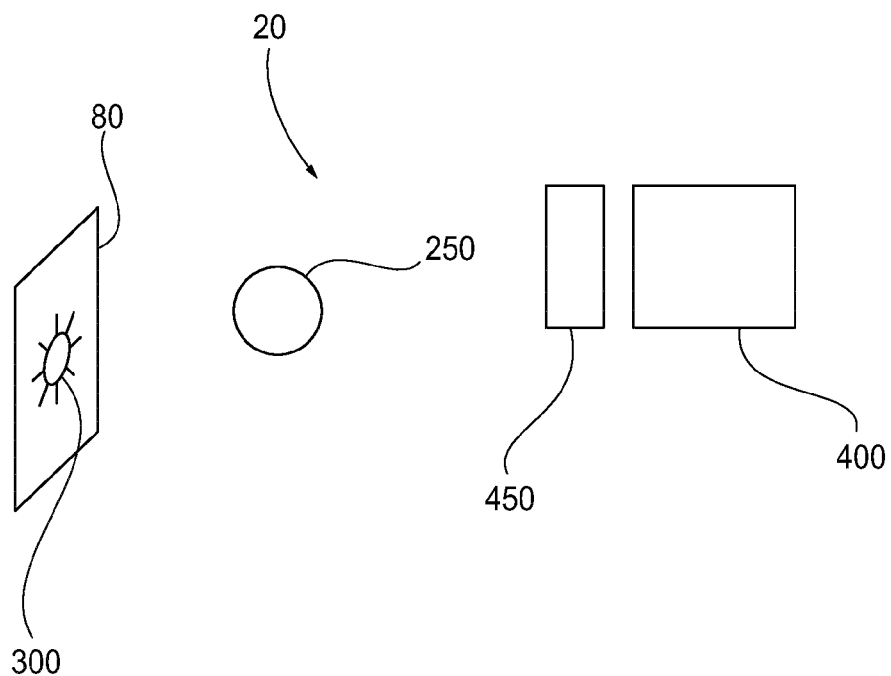
FIG. 2B is a side, schematic view of an intensity measurement system according to FIG. 1B, and including a schematic representation of a transparent article.
Figure 2C:
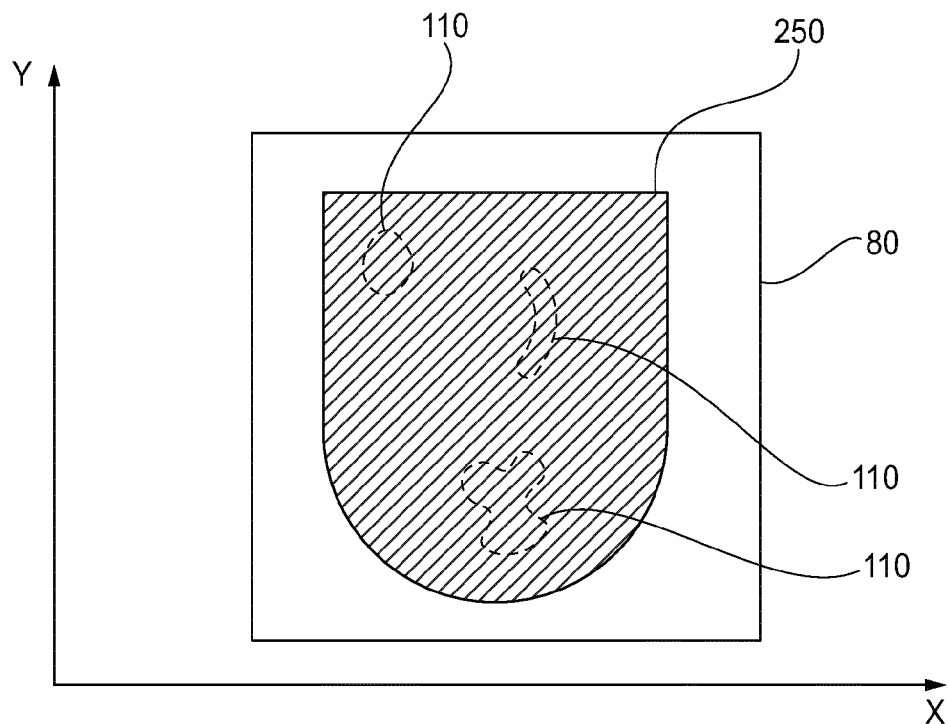
FIG. 2C is a front, schematic view of a reference surface with a transparent article and illustrating a plurality of measurement regions.

FIGS. 2A and 2B are schematic representations according to the examples shown in FIGS. 1A and 1B, respectively, wherein a transparent article 250 is disposed over, or covers, at least a portion of the reference surface 80. Examples of transparent articles 250 include any article with transparent properties at selected wavelength or range of wavelengths of light. These may include ophthalmic articles, elements and devices including photochromic ophthalmic devices display articles, elements and devices, windows, mirrors, and active and passive liquid crystal cell articles, elements and devices. When the transparent article 250 has a sufficiently high index of refraction, the transparent article 250 can be placed in a medium, such as water, with a higher index of refraction than air.

Figure 3A:
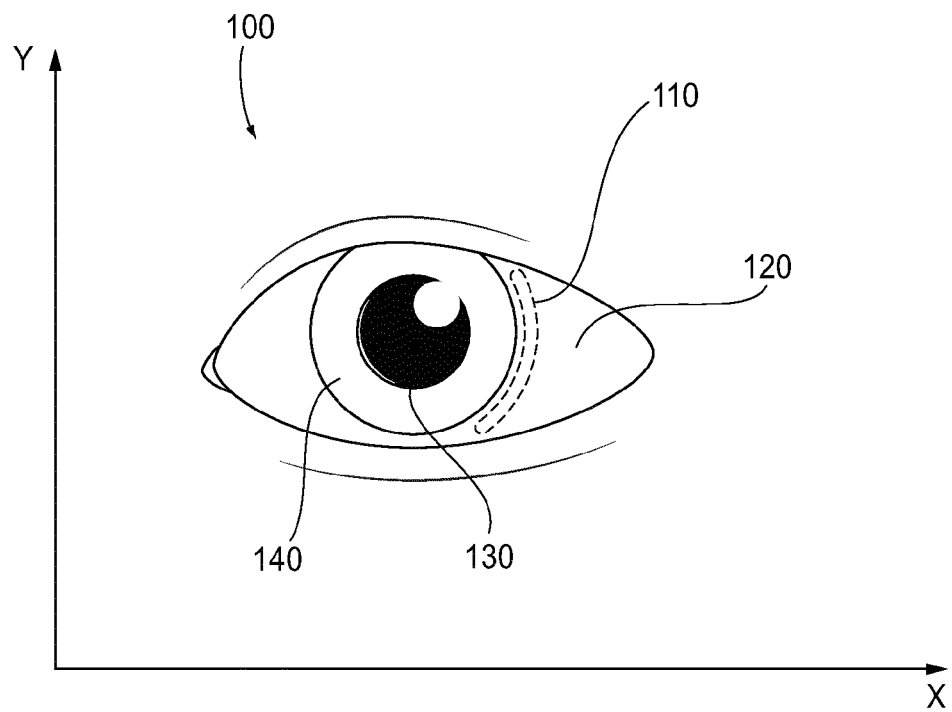
FIG. 3A is a front, schematic view of an ocular surface illustrating a measurement region.
Figure 4A:
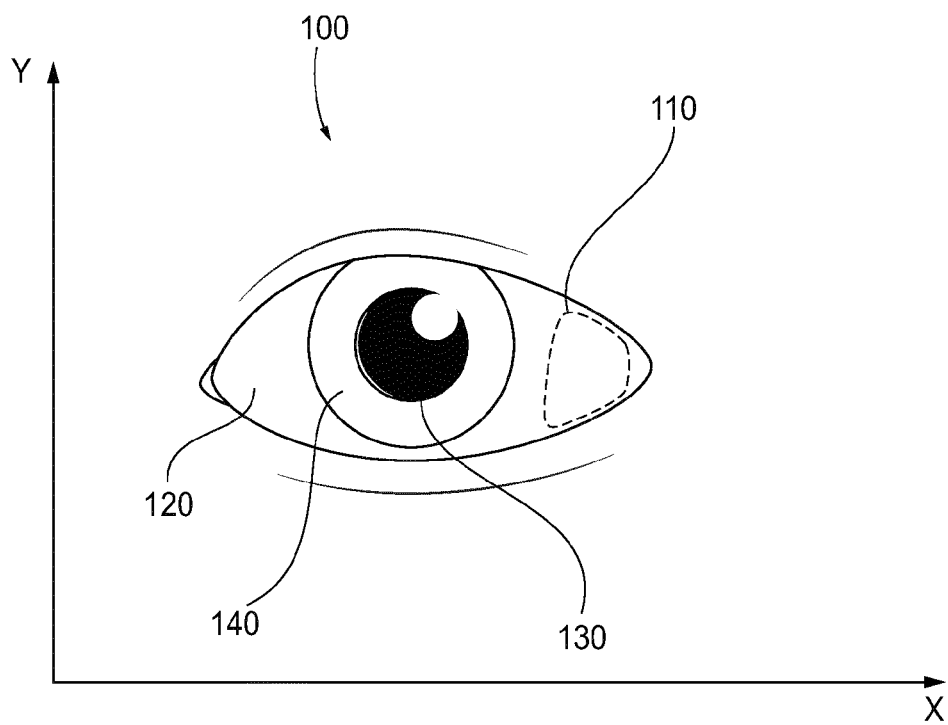
FIG. 4A is a front, schematic view of an ocular surface illustrating another measurement region.

FIGS. 3A and 4A are schematic representations of an ocular surface 100 imposed over x and y axes. These figures shows the ocular surface 100 wherein no portion thereof is covered by a transparent article 250. With reference to FIGS. 1C, 3A and 4A, a first measurement of the intensity of electromagnetic radiation reflected from the ocular surface 100 is taken with the imaging device 400. The first measurement can be taken on a selected portion of the ocular surface 100. For example, the first measurement can be taken over a region 110 of the ocular surface 100. The region 110 may be a region of the sclera 120 of a human eye or may be a region of a three-dimensional article mimicking the sclera 120 of a human eye. The region 110 may include a relatively large area of the ocular surface 100. For example, the region 110 may include 1 square millimeter ($mm^2$) to 25 $mm^2$, such as 1 $mm^2$ to 10 square millimeters ($mm^2$). The area of the region 110 may be substantially equivalent to the area of the transparent article 250, e.g., ophthalmic device, to be measured. Or, the area of the region 110 may be greater than or less than the area of the transparent article to be measured. FIG. 3A is a schematic representation of the ocular surface 100 in which the region 110 is located on a portion of the sclera 120 that is adjacent to the iris 140 of the ocular surface 100. The region 110 illustrated in FIG. 3A is a curved, elongated region. In FIG. 4A, the region 110 is spaced from the iris 140. The region 110 illustrated in FIG. 4A is a circular or oval region. It is to be understood that the region 110 can be of any shape. It also is to be understood that region 110 may be located on any portion of the ocular surface 100, including but not limited to the iris 140, pupil 130, sclera 120, or any combination thereof.

Figure 3B:
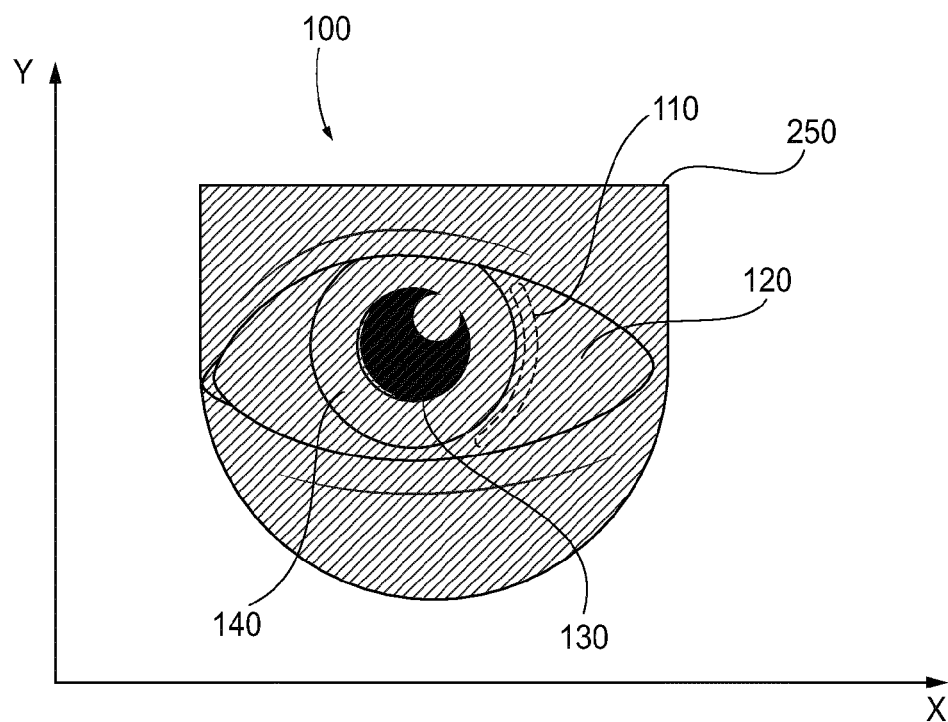
FIG. 3B is a front, schematic view of an ocular surface according to FIG. 3A showing an exemplary transparent article over the ocular surface.
Figure 4B:
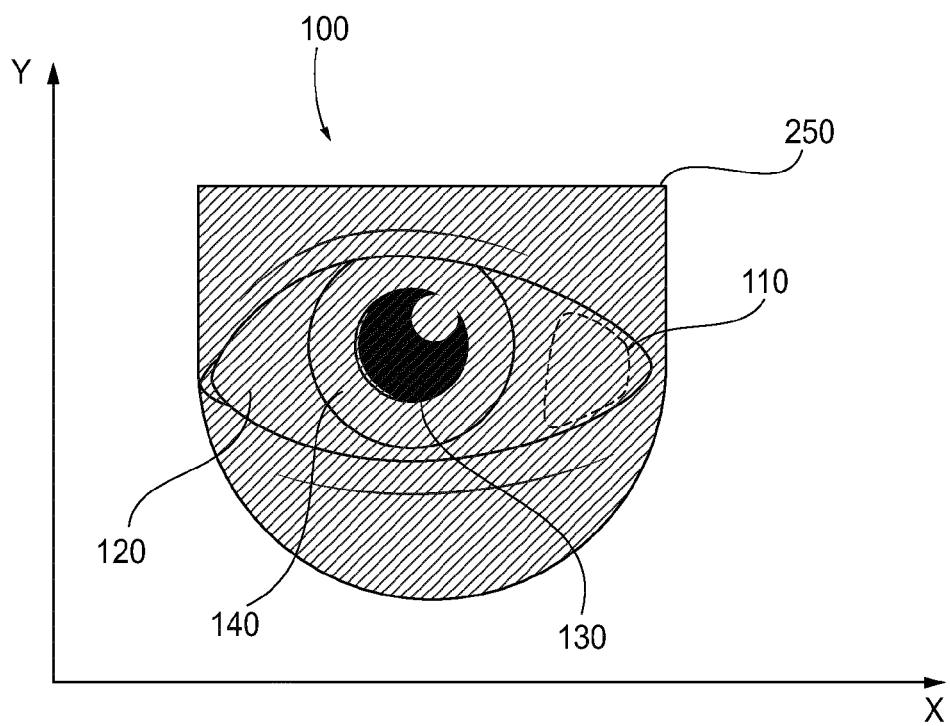
FIG. 4B is a front, schematic view of an ocular surface according to FIG. 4A showing an exemplary transparent article over the ocular surface.

FIGS. 3B and 4B are schematic representations of an ocular surface 100 in which a transparent article 250, such as a spectacle lens or other transparent article, is placed over the ocular surface 100. The transparent article 250 may be an off-eye ophthalmic device i.e., an ophthalmic device that is configured not to be placed in direct contact with an eye. The transparent article 250 may be a fixed-tint ophthalmic device, or a photochromic ophthalmic device. When the transparent article 250 is a photochromic ophthalmic device, the photochromic ophthalmic device may be activated or non-activated. The transparent article 250 may be spaced from the ocular surface (for example, when the transparent article 250 is a spectacle lens). The transparent article 250 can overlay all or a portion of the region 110. If the transparent article 250 is a photochromic ophthalmic device, the photochromic ophthalmic device can be exposed to actinic radiation for a period of time to achieve a desired level of activation. For example, for a period of time to achieve full activation.

Figure 3C:
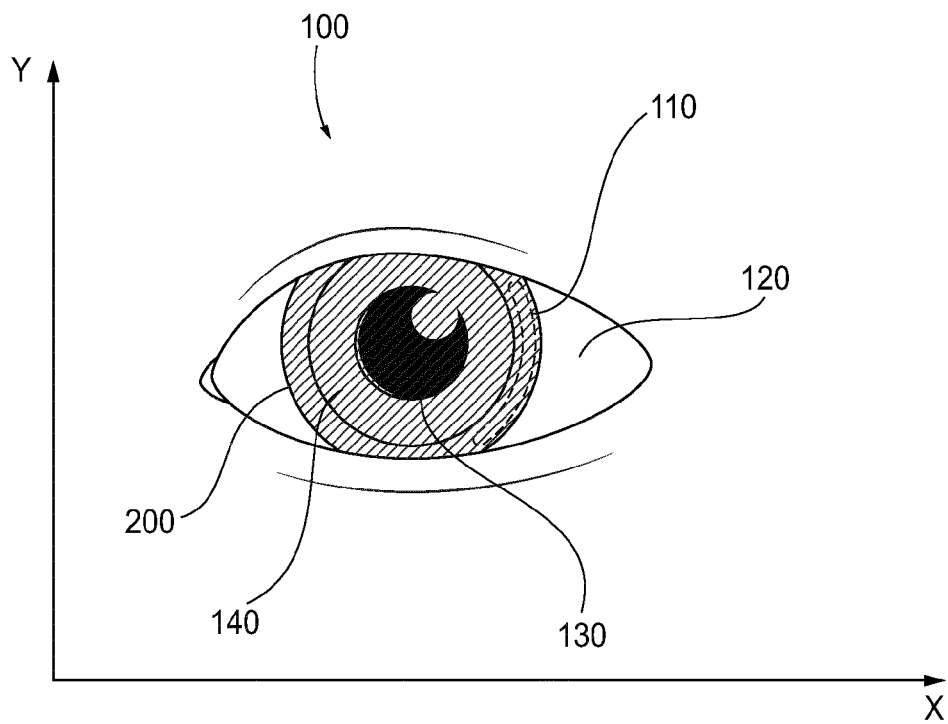
FIG. 3C is a front, schematic view of an ocular surface according to FIG. 3A showing an exemplary ophthalmic device over a portion of the ocular surface.
Figure 4C:
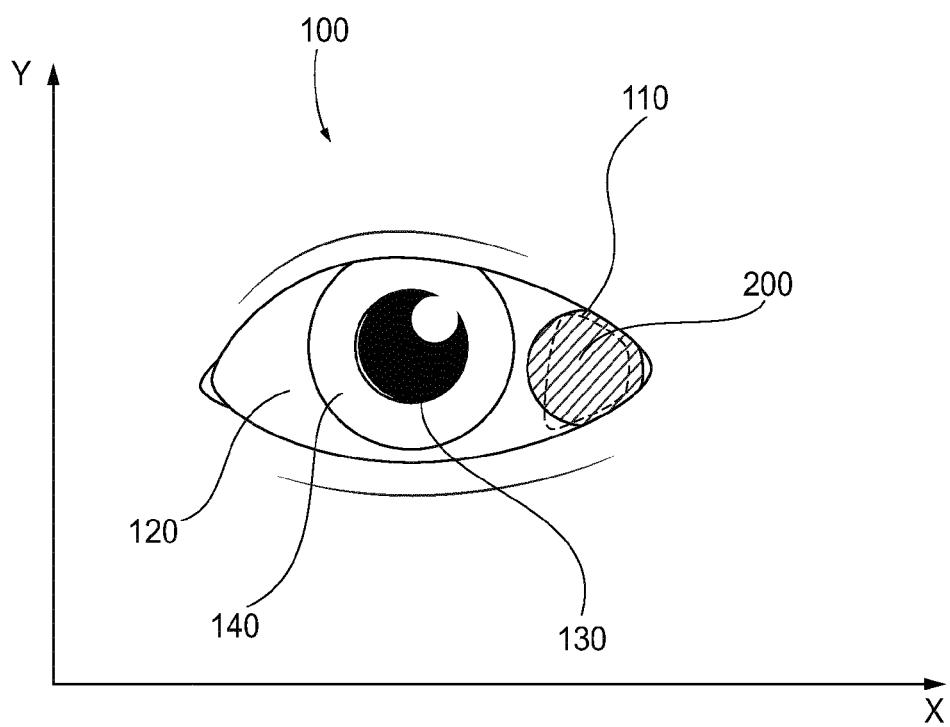
FIG. 4C is a front, schematic view of an ocular surface according to FIG. 4A showing an exemplary ophthalmic device over a portion of the ocular surface.

FIGS. 3C and 4C are schematic representations of the ocular surface 100 in which a transparent article in the form of an ophthalmic device 200 is covering the ocular surface 100. The ophthalmic device 200 may be an on-eye ophthalmic device—i.e., an ophthalmic device that is configured to be placed in direct contact with an eye. The ophthalmic device 200 may be a fixed-tint ophthalmic device, or a photochromic ophthalmic device. When the ophthalmic device 200 is a photochromic ophthalmic device, the photochromic ophthalmic device 200 may be activated or non-activated. The ophthalmic device 200 can be in direct contact with the ocular surface (for example, when the ophthalmic device 200 is a contact lens, such as an RGP contact lens). The ophthalmic device 200 can cover all or a portion of the region 110. If the ophthalmic device 200 is a photochromic ophthalmic device 200, the photochromic ophthalmic device 200 can be exposed to actinic radiation on the ocular surface 100 for a period of time to achieve a desired level of activation. For example, for a period of time to achieve full activation.

With reference to FIGS. 2A-2C, a second measurement of the intensity of electromagnetic radiation, e.g., visible light, transmitted through the transparent article 250 that is reflected or emitted by the reference surface 80 is taken with the imaging device 400. The second measurement includes intensity data over at least a portion of the region of the reference surface 80 covered or overlaid by the transparent article 250. The area of the region of the reference surface 80 may be substantially equivalent to the area of the transparent article 250. Or, the area of region of the reference surface 80 may be greater than the area of the transparent article 250, or less than the area of the transparent article 250. The wavelength or range of wavelengths measured for the first measurement and the second measurement preferably are the same.

FIG. 2C is a schematic representation of a transparent article 250 overlaying or covering a portion of reference surface 80, which is imposed over x and y axes. As shown in the Figure, one or more regions 110 of the reference surface 80 may be chosen. The regions 110 may be uniformly of irregularly shaped, and may comprise all of, or a subset of, the portion of the reference surface 80 that is overlaid or covered by the transparent article 250. Measurements of intensity of electromagnetic radiation over a desired range of wavelengths may be taken by an imaging device 400 over the one or more regions 110 of the reference surface 80. The one or more regions 110 may be chosen randomly, or may correspond to portions of the transparent article 250, the transmittance of light through which is desired to be measured.

When the imaging device 400 captures image data over all or at least a portion of the surface area of the transparent article 250, the intensity values from across the transparent article 250 can be compared. Such a comparison is useful in that it allows for the identification in differences in transmittance across the transparent article 250. This indicates the location of certain image defects on the transparent article 250. This configuration also allows a user to map a gradient of transmittance in a transparent article 250 having a photochromic gradient. In this circumstance, the region 110 of a reference surface 80 (such as an ocular surface 100) can correspond in size with the desired area of the transparent article 250 to be measured. Alternatively, multiple second measurements may be taken wherein the transparent article 250 covers or overlays different portions of the reference surface 80, and intensity data can be taken from regions 110 of the reference surface 80 in those images.

Similarly, with reference to FIGS. 3B and 4B, the second measurement of the intensity of electromagnetic radiation, e.g., visible light, transmitted through the transparent article 250 that is reflected or emitted by the ocular surface 100 is taken with the imaging device 400. The second measurement includes intensity data over at least a portion of the region 110 overlaid by the transparent article 250. The area of the transparent article 250 may be substantially equivalent to the area of the region 110. Or, the area of the transparent article 250 may be greater than the region 110, or less than the region 110. The wavelength or range of wavelengths measured for the first measurement and the second measurement preferably are the same.

With reference to examples schematically depicted in FIGS. 3C and 4C, the second measurement of the intensity of electromagnetic radiation, e.g., visible light, transmitted through the transparent article 250 that is reflected by the ocular surface 100 is taken with the imaging device 400. The second measurement includes intensity data over at least a portion of the region 110 covered by an ophthalmic device 200. The area of the ophthalmic device 200 may be substantially equivalent to the area of the region 110. Or, the area of the ophthalmic device 200 may be greater than the region 110, or less than the region 110. The wavelength or range of wavelengths measured for the first measurement and the second measurement preferably are the same.

With specific reference to FIGS. 3A and 3C, the ophthalmic device 200 may cover portions of the sclera 120 even when the center area of the ophthalmic device 200 is positioned over the pupil 130. The region 110 in FIGS. 3A and 3C is located on a portion of the sclera 120 that is adjacent to the iris 140. The region 110 is located close enough to the iris 140 that, when the ophthalmic device 200 is positioned on the ocular surface 100 in an orientation where the center area of the ophthalmic device 200 is positioned over the pupil 130, the region 110 of the sclera 120 is covered by at least a portion of the ophthalmic device 200. For example, covered by a peripheral portion of the ophthalmic device 200. In this configuration, the second measurement is taken over at least a portion of the region 110 located between the outer peripheral edge of the ophthalmic device 200 and the outer peripheral edge of the iris 140.

FIG. 4C depicts an example wherein the ophthalmic device 200 is positioned to cover a portion of the ocular surface 100 so that the center area of the ophthalmic device 200 does not cover the iris 130. In this configuration, the region 110 of the sclera 120 is all or partly covered by the ophthalmic device 200, and the second measurement of the intensity of electromagnetic radiation, e.g., visible light, reflected by the ocular surface 100 is taken with the imaging device 400. The intensity data can include data from the center area of the ophthalmic device 200. That is the portion of the ophthalmic device 200 that is most likely to be positioned over a wearer's pupil 130 during normal wear and, thus, may have the most effect on the wearer's experience.

With further reference to FIGS. 1A-1B, and 2A-2B, in order to compare intensity data between the first measurement and the second measurement, position data on the reference surface 80 is determined. A position on the reference surface 80 between the two intensity measurements may be determined by comparing the shape of the reference surface 80 in each image. This may be accomplished by visually comparing the images and choosing a range of coordinates in each image to be analyzed. Additionally or alternatively, the reference surface may be overlaid with coordinates, such as x-y coordinates, or other identifying marks which may aid in determining position by comparison of image data between the first and second measurements in embodiments wherein the shape of the reference surface 80 is otherwise uniform. Software stored in the memory of the imaging device 400, or in an external computing device, may be applied by a processor to automatically compare the images in order to determine the region of the reference surface 80 covered or overlaid by the transparent article 250. A processor may be located in the imaging device 400, or an external processor may be used.

Similarly, with reference to FIGS. 1C, 3A, 3B, 4A, and 4B, in order to compare intensity data between the first measurement and the second measurement, position data on the ocular surface 100 is determined. A position on the ocular surface 100 between the two intensity measurements may be determined by comparing the shape of the ocular surface 100 in each image. This may be accomplished by visually comparing the images and choosing a range of coordinates in each image to be analyzed. Software stored in the memory of the imaging device 400, or in an external computing device, may be applied by a processor to automatically compare the images in order to determine the region of the ocular surface 100 covered or overlaid by the transparent article 250. A processor may be located in the imaging device 400, or an external processor may be used.

With reference to FIGS. 1C, 3A, 3C, 4A and 4C, in order to compare intensity data between the first measurement and the second measurement, position data on the ocular surface 100 is determined. As above, a position on the ocular surface 100 between the two intensity measurements may be determined by comparing the shape of the ocular surface 100 in each image. This may be accomplished by visually comparing the images and choosing a range of coordinates in each image to be analyzed. Software stored in the memory of the imaging device 400, or in an external computing device, may be applied by a processor to automatically compare the images in order to determine the region 110 covered by the ophthalmic device 200. A processor may be located in the imaging device 400, or an external processor may be used.

With respect to FIGS. 1C, 3A-3C and 4A-4C, to ensure that intensity data taken from the same region 110 of the ocular surface 100 are compared when analyzing the first and second measurements, relative movement between the ocular surface 100 and the imaging device 400 may be limited between measurements. Relative movement between the ocular surface 100 and the imaging device 400 may be limited by positioning imaging device 400 on a fixed or portable stand, not shown. If the ocular surface 100 is an artificial device, the device can be bolted or locked in place. If the ocular surface 100 is a human eye, movement of a wearer's head may be limited by a head rest, chin rest, bite bar, or other mechanism known in the art. With respect to FIGS. 1A-1B and 2A-2B, similar measures may be taken to limit relative movement between the reference surface 80, transparent article 250, and imaging device. These measures may include fixing the position of the reference surface 80, and/or fixing the position of the transparent article 250.

Figure 5:
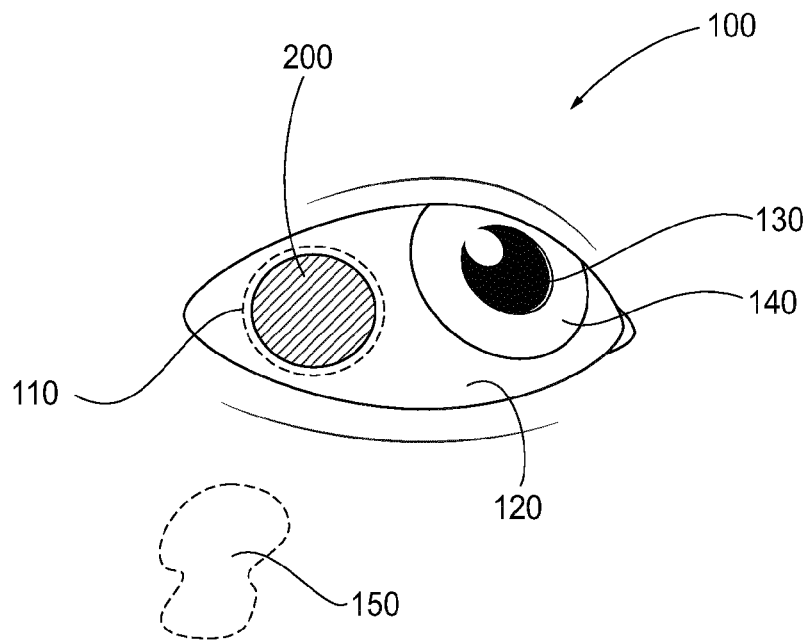
FIG. 5 is a front, schematic view of an ocular surface showing an exemplary positioning of the ophthalmic device.

FIG. 5 illustrates an example of positioning the ophthalmic device 200, e.g., a photochromic contact lens, such as an RGP contact lens, covering an ocular surface 100 in the form of a human eye. In this example, a wearer can maximize exposure of the sclera 120 during the first and second measurements. It is preferable that the proportion of the region 110 that is comprised by the sclera 120 is as large as possible. The wearer may maximize exposure of the sclera 120 by looking up and to the left or right. It is to be understood that the wearer may look in other directions, such as left, right, up, down, or directly at the imaging device 400. The imaging device 400 takes image data, including data on intensity of electromagnetic radiation reflected from anywhere on the ocular surface 100. However, in order to determine the transmittance of the photochromic ophthalmic device 200, the region 110 of the ocular surface 100 that will be covered by the photochromic ophthalmic device 200 during the second measurement is of particular importance. This covered portion may include a pupil 130, iris 140, and/or sclera 120 of an eye. Due to the relative darkness of the iris 140 and pupil 130, it may be preferable for the region 110 of the ocular surface 100 that will be covered by the photochromic ophthalmic device 200 to be mostly or entirely composed by the sclera 120, in order to reduce error in intensity measurements. This may be preferable when the dynamic range of the imaging device 400 is relatively low.

With further reference to FIG. 5, a wearer maximizes exposure of the sclera 120 of the ocular surface 100, for example, by looking up and to the left or up and to the right. A first intensity measurement of electromagnetic radiation reflected from the ocular surface 100 is taken with the imaging device 400. The exposed portion of the sclera 120 during the first measurement preferably includes the region 110. The ophthalmic device 200 is placed over the region 110 on the ocular surface 100. If the ophthalmic device 200 is a photochromic ophthalmic device 200, the photochromic ophthalmic device 200 is exposed to actinic radiation for a period of time to achieve a desired level of photochromic activation. A second intensity measurement is taken with the imaging device 400. The intensity measurements include data transmitted through the ophthalmic device 20 that is located over the region 110.

With reference to FIGS. 1A-1C, and 2A-2B, if the transparent article 250 has photochromic properties, the first intensity measurement may be made with the transparent article 250 in place over the reference surface 80 in a first state. The first state can be a non-activated state. The second intensity measurement can be made with the imaging device 400 after the photochromic transparent article 250 is in a second state. The second state can be an activated state. The second intensity measurement may be taken through a central portion of the transparent article 250. Alternatively, the second intensity measurement may be taken through a peripheral portion of the transparent article 250.

Similarly, with reference to FIGS. 4A and 4B, if the transparent article 250 has photochromic properties, the first intensity measurement may be made with the transparent article 250 in place over the ocular surface 100 in a first state. The first state can be a non-activated state. The second intensity measurement can be made with the imaging device 400 after the photochromic transparent article 250 is in a second state. The second state can be an activated state. The second intensity measurement may be taken through a central portion of the transparent article 250. Alternatively, the second intensity measurement may be taken through a peripheral portion of the transparent article 250.

With reference to FIGS. 3C, 4C, and 5, if the ophthalmic device 200 is a photochromic ophthalmic device 200, the first intensity measurement may be made with the ophthalmic device 200 in place on the ocular surface 100 in a first state. The first state can be a non-activated state. The second intensity measurement can be made with the imaging device 400 after the photochromic ophthalmic device 200 is in a second state. The second state can be an activated state. The second intensity measurement may be taken through a central portion of the ophthalmic device 200. Alternatively, the second intensity measurement may be taken through a peripheral portion of the ophthalmic device 200. Similarly, with reference to FIGS. 2A-C, the first intensity measurement may be made with a photochromic transparent article 250 in place over or covering the reference surface in a first state, and the second intensity measurement can be made with the imaging device 400 after the photochromic transparent article 250 is in a second state. The second state can be an activated state.

As stated above, due to the relative darkness of the iris 140 and pupil 130, it may be preferable for the region 110 of the ocular surface 100 that will be covered by the photochromic ophthalmic device 200 to be mostly or entirely composed by the sclera 120, in order to reduce error in intensity measurements. However, it is to be understood that the region 110 may be comprised by the iris 140 and/or the pupil 130. According to this configuration, a first image may be taken including a region 110 of the iris 140 and/or pupil 130, then an activated photochromic ophthalmic device 200 may be placed covering or overlaying the region 110, and a second image may be taken including the same region 110. Similarly, with reference to FIGS. 2A and 2C, in examples wherein a reference surface 80 is colored similarly to an iris 140 or pupil 130, a first image may be taken including a region 110 of the reference surface 80, then a transparent article 250 may be placed covering or overlaying the region 110, and a second image may be taken including the same region 110. In such examples, it may be preferable to use an imaging device 400 that is more sensitive than a CCD or CMOS detector, such as traditional photomultiplier arrays, or silicon photomultiplier arrays. Non-limiting examples of suitable arrays are the silicon photomultiplier array manufactured by SensL of Cork, Ireland, and multipixel photon counters, manufactured by Hamamatsu Photonics of Hamamatsu City, Japan. When using photomultiplier arrays, care should be taken to avoid damage to the imaging device due to exposure to outdoor conditions.

With reference to FIGS. 1A-1C, where the imaging device 400 comprises a CCD, some of the measured intensity values may be partially-attributable to dark current on the CCD. Dark current can be dependent on the temperature on the CCD. The manufacturer of the imaging device 400 may provide a table or plot of intensity values on the CCD due to dark current. Intensity attributable to dark current at various temperatures can be determined by taking one or more measurements with the imaging device 400 while the shutter is closed. Temperature measurements can be taken with a temperature measuring device concurrently with measuring the first and second intensity values. The imaging device 400 may include a temperature measuring device, or an external temperature measuring device may be used.

In the first and second measurements, intensity data may be taken over a range of wavelengths, or for specific wavelengths. When comparing the data for the two measurements, the following equation may be applied:

$$T_{Meas} = \frac{(I_T - d)}{(I_O - d)}$$

where $T_{Meas}$ is the transmittance of electromagnetic radiation through the transparent article 250;

$I_O$ is the measurement of the first intensity;

$I_T$ is the measurement of the second intensity; and d is the intensity value attributable to dark current on the intensity measuring device.

Measured absorbance $A_{Meas}$ of the transparent article 250 is defined as $\log_{10}(1/T)$.

With reference to FIG. 1B, it is to be understood that, for examples of reference surface 80 that emit light in the desired wavelength range, the calculation of $T_{Meas}$ returns an accurate value for transmittance of the transparent article 250. However, with reference to FIGS. 1A and 1C, in examples where the measured intensity of electromagnetic radiation of the desired wavelength range is due to reflection from the reference surface 80, such as an ocular surface 100, and not emission therefrom, the intensity of electromagnetic radiation measured in the second measurement passes through the transparent article 250 twice, i.e., once when it travels through the transparent article 250 (such as an ophthalmic device 200) to the reference surface 80 (or, to the ocular surface 100) from the light source 300, and once again when it is reflected from the reference surface 80 (or ocular surface 100) back through the transparent article 250, to the imaging device 400. In order to correct for electromagnetic radiation passing through the transparent article 250 twice, measured absorbance $A_{Meas}$ is divided by a factor of two to obtain a corrected absorbance value, $A_{Corr}$, or:

$$A_{Corr} = \frac{A_{Meas}}{2}.$$

A value of a corrected transmittance $T_{Corr}$ is calculated as follows:

$$T_{Corr} = 1/10^{A_{Corr}}.$$

The above equations reduce to:

$$T_{Corr} = \frac{1}{\sqrt{\frac{I_O - d}{I_T - d}}}$$

It is to be understood that transmittance and absorbance are closely related values. Thus, unless the context explicitly indicates otherwise, any disclosure or teaching in this application referring to determining transmittance also refers to determining absorbance, and vice versa.

It is to be understood that a change in transmittance and/or absorbance may be determined, wherein an unactivated photochromic transparent article 250 is positioned covering or over a reference surface 80. Then a first measurement is taken. Then the photochromic transparent article 250 is activated with actinic radiation. Then a second measurement is taken. Then the value of change of transmissivity or change of absorbance is determined.

The intensity of electromagnetic radiation emitted by the light source 300 may vary over time. For example, when the method of the invention is practiced in an outdoor environment where the light source 300 is the sun, clouds may pass over the sun between the first and second measurements, affecting the intensity of incident electromagnetic radiation on the ocular surface 100. In order to compensate for variations in incident electromagnetic radiation intensity, the imaging device 400 may take measurements from a secondary location 150. The secondary location 150 can be on, adjacent, or near the reference surface 80. In examples according to FIGS. 1C, 3A, 4A and 5, the secondary location 150 can be on the ocular surface 100 or can be an area adjacent to or near the ocular surface but outside of the region 110. With reference to FIG. 5, the imaging device 400 may take intensity data from the secondary location 150 at the same times when the first and second intensity measurements are taken. The secondary location 150 can be part of the same images or sets of image data which include the intensity data from the first and second measurements. The secondary location 150 may be positioned on the ocular surface 100 that does not comprise the region 110. Or, the secondary location 150 may be located elsewhere, such as on a wearer's face, or on a surface located near the wearer or near the ocular surface 100. Such a surface may be configured to reflect electromagnetic radiation of a specific wavelength range. An example of a secondary location 150 may be a colored tab or dot located on the face of a wearer or located near the ocular surface 100, and which acts as a steady reflector. The secondary location 150 may be white, gray, or any color. Another example of a secondary location 150 may be a portion of a wearer's face that is not covered with a colored tab or dot. FIG. 5 shows an example of the position of the secondary location 150, however, it is to be understood that any suitable surface may be used for secondary location 150.

Comparisons between measured values of electromagnetic radiation reflected from the secondary location 150 between the first and second measurement may be used to compensate for changes in electromagnetic radiation intensity emitted from the light source 300. For example, if intensity data taken from the secondary location 150 indicates a ten percent decrease in intensity of electromagnetic radiation emitted from the light source 300 between the first and second measurements, the values of the first intensity ($I_O$) and/or the second intensity ($I_T$) may be adjusted by that amount when determining a measured transmittance (T) and absorbance ($A_{Meas}$) as well as corrected absorbance ($A_{Corr}$) and corrected transmittance ($T_{Corr}$). This adjustment may be applied by a processor which implements software.

Exemplary software that may be used to analyze the intensity data include Igor Pro, developed by WaveMetrics; Image J, developed by the National Institutes of Health; LabVIEW, developed by National Instruments; Origin and OriginPro, developed by OriginLab; and Microsoft Excel, developed by Microsoft Corporation. Additional software may perform analysis of intensity data, as known in the applicable art.

In another exemplary method, a non-activated photochromic transparent element 250 may be placed over or covering a reference surface 80. By "non-activated" is meant that the ophthalmic device 200 has not been exposed to actinic radiation or has not been exposed to actinic radiation of a sufficient intensity and/or for a sufficient time to be fully activated. The non-activated photochromic transparent element 250 covers or overlays at least a portion of the region 110. A first set of intensity data is taken with the imaging device 400 of the region 110 of the reference surface 80 that is covered or overlaid by the non-activated photochromic transparent element 250. The photochromic transparent element 250 is activated, for example, fully activated. A second set of intensity data is taken with the imaging device 400 of the region 110 covered or overlaid by the now activated photochromic transparent element 250. The transmittance is determined by comparing the two sets of intensity data.

In yet another exemplary method, a non-activated ophthalmic device 200 may be placed over or covering the ocular surface 100. By "non-activated" is meant that the ophthalmic device 200 has not been exposed to actinic radiation or has not been exposed to actinic radiation of a sufficient intensity and/or for a sufficient time to be fully activated. The non-activated ophthalmic device 200 covers or overlays at least a portion of the region 110. A first set of intensity data is taken with the imaging device 400 of the region 110 of the ocular surface 100 that is covered or overlaid by the non-activated ophthalmic device 200. The ophthalmic device 200 is activated, for example, fully activated. A second set of intensity data is taken with the imaging device 400 of the region 110 covered or overlaid by the now activated ophthalmic device 200. The transmittance is determined by comparing the two sets of intensity data.

In a further exemplary method, an activated photochromic transparent article 250 is placed over or covering a reference surface 80, wherein the photochromic transparent article 250 does not cover or overlay the entire reference surface 80. Image data is taken with the imaging device 400 of the entire reference surface 80. Those image data are converted to CIE color coordinated (e.g., CIE XYZ 1931 format, CIE XYZ 1964 format, or CIE XYZ 2004 format) using any process known in the art. CIE X, Y, and Z values from image data from regions of the reference surface 80 that are covered or overlaid by the transparent article 250, and regions that are not covered or overlaid by the transparent article 250, are compared to calculate the change in transmissivity relative to the X, Y, and Z color matching functions. It may be preferable to use CIE Y values, as it peaks around 555 nm. Transmittance may be determined according to the following equation:

$$T_Y = \log_{10}\left(\frac{Y_{uncovered}}{Y_{above}}\right)$$

where $T_Y$ is transmittance of the ophthalmic device 200 determined according to CIE Y values, $Y_{uncovered}$ is the Y value of a portion of the image of the reference surface 80, wherein the reference surface 80 is not covered or overlaid by the transparent article 250, and $Y_{above}$ is the Y value of a portion of the image of the reference surface 80, wherein the reference surface 80 is covered or overlaid by the transparent article 250. Transmittance using X and Z values may be determined using the same equation using X and X values, respectively, in place of Y values.

In another exemplary method, an activated ophthalmic device 200 is placed over or covering an ocular surface 100, wherein the ophthalmic device 200 does not cover or overlay the entire ocular surface 100. Image data is taken with the imaging device 400 of the entire ocular surface 100. Those image data are converted to CIE color coordinated (e.g., CIE XYZ 1931 format, CIE XYZ 1964 format, or CIE XYZ 2004 format) using any process known in the art. CIE X, Y, and Z values from image data from regions of the ocular surface 100 that are covered or overlaid by the ophthalmic device 200, and regions that are not covered or overlaid by the ophthalmic device 200, are compared to calculate the change in transmissivity relative to the X, Y, and Z color matching functions. It may be preferable to use CIE Y values, as it peaks around 555 nm. Transmittance may be determined according to the following equation:

$$T_Y = \log_{10}\left(\frac{Y_{uncovered}}{Y_{above}}\right)$$

where $T_Y$ is transmittance of the ophthalmic device 200 determined according to CIE Y values, $Y_{uncovered}$ is the Y value of a portion of the image of the ocular surface 100, wherein the ocular surface 100 is not covered or overlaid by the ophthalmic device 200, and $Y_{above}$ is the Y value of a portion of the image of the ocular surface 100, wherein the ocular surface 100 is covered or overlaid by the ophthalmic device 200. Transmittance using X and Z values may be determined using the same equation using X and X values, respectively, in place of Y values.

Figure 6:
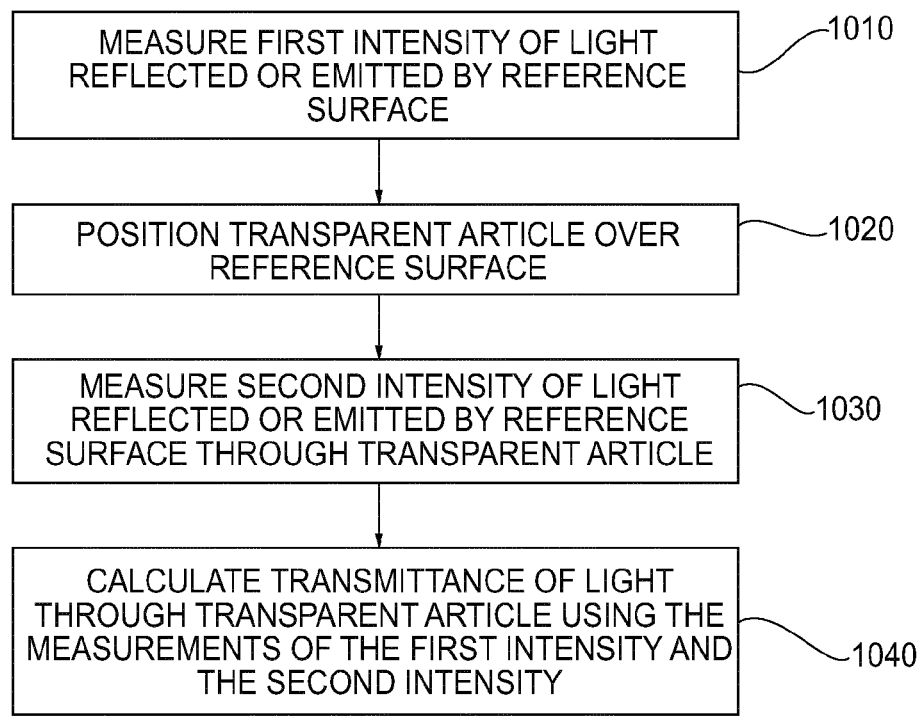
FIG. 6 is a block diagram of an exemplary measurement method of the invention.

FIG. 6 is a block diagram depicting steps of an exemplary method of the invention. Step 1010 includes measuring a first intensity of electromagnetic radiation reflected or emitted by a reference surface 80. This step may be performed with the intensity measuring device 400. Step 1020 includes positioning transparent article 250 over the reference surface 80. Step 1030 includes measuring a second intensity of electromagnetic radiation transmitted through the transparent article 250 that is emitted or reflected by the reference surface 80. Step 1040 includes calculating the transmittance of electromagnetic radiation through the transparent article 250 using the measurements of the first intensity and the second intensity.

Figure 7:
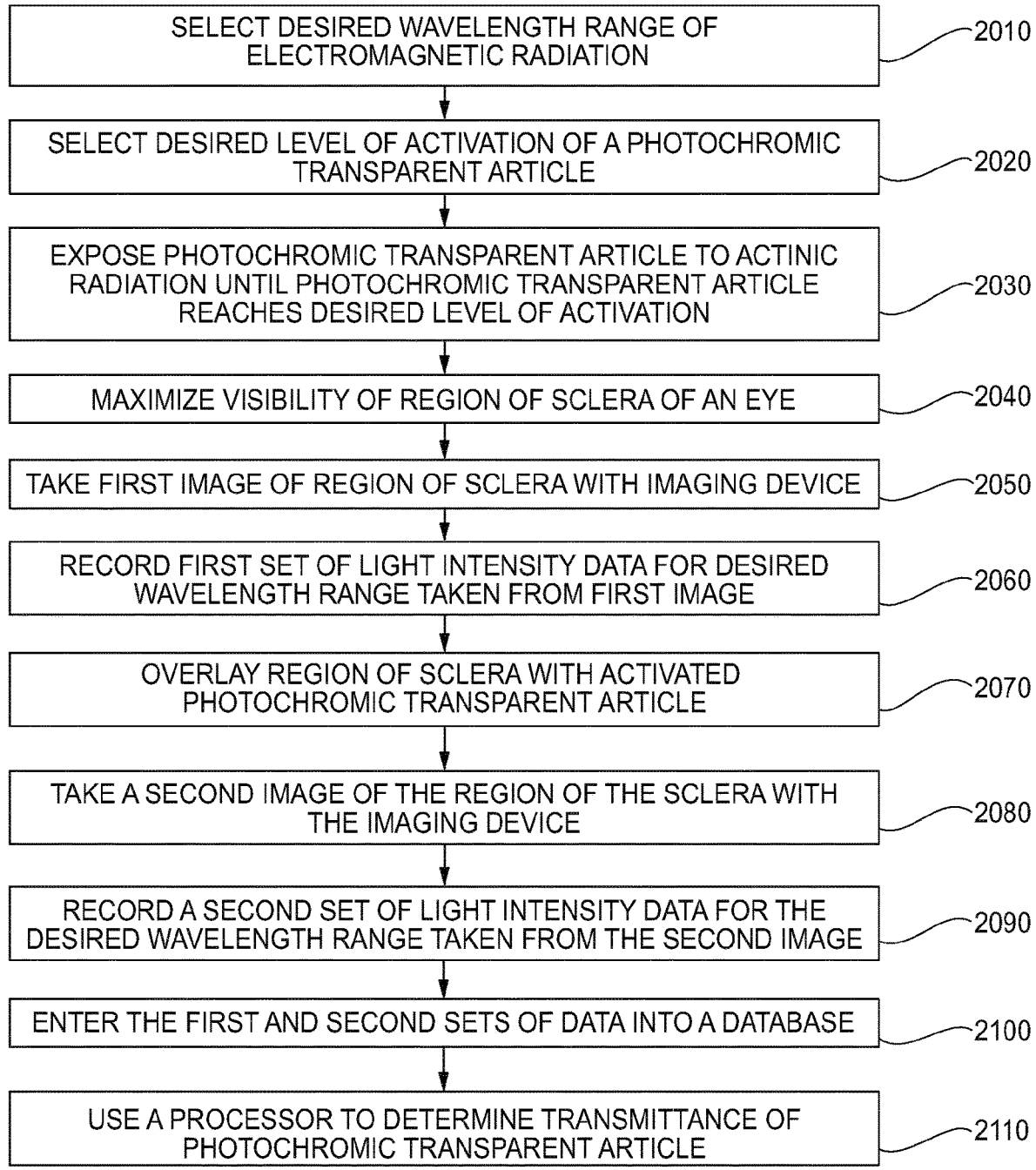
FIG. 7 is a block diagram of another exemplary measurement method of the invention.

FIG. 7 is a block diagram depicting steps of another exemplary method of the invention. Step 2010 includes selecting a desired wavelength range of electromagnetic radiation. Step 2020 includes selecting the desired level of activation of a transparent article 250, preferably a photochromic transparent article 250. Step 2030 includes exposing the photochromic transparent article 250 to actinic radiation until the photochromic transparent article 250 reaches the desired level of activation. Step 2040 includes maximizing visibility of a region 110 of a sclera 120 of an eye. Step 2050 includes taking a first image of the region 110 of the sclera 120 with an imaging device 400. The imaging device 400 may be configured to record electromagnetic radiation intensity data over the desired wavelength range. Step 2060 includes recording a first set of electromagnetic radiation intensity data for the desired wavelength range taken from the first image. Step 2070 includes overlaying the region 110 of the sclera 120 with the activated photochromic transparent article 250. Step 2080 includes taking a second image of the region 110 of the sclera 120 with the imaging device 400. Step 2090 includes recording a second set of electromagnetic radiation intensity data for the desired wavelength range taken from the second image. Step 2100 includes entering the first and second sets of data into a database. Step 2110 includes using a processor to determine the transmittance of the photochromic transparent article 250.

Figure 8:
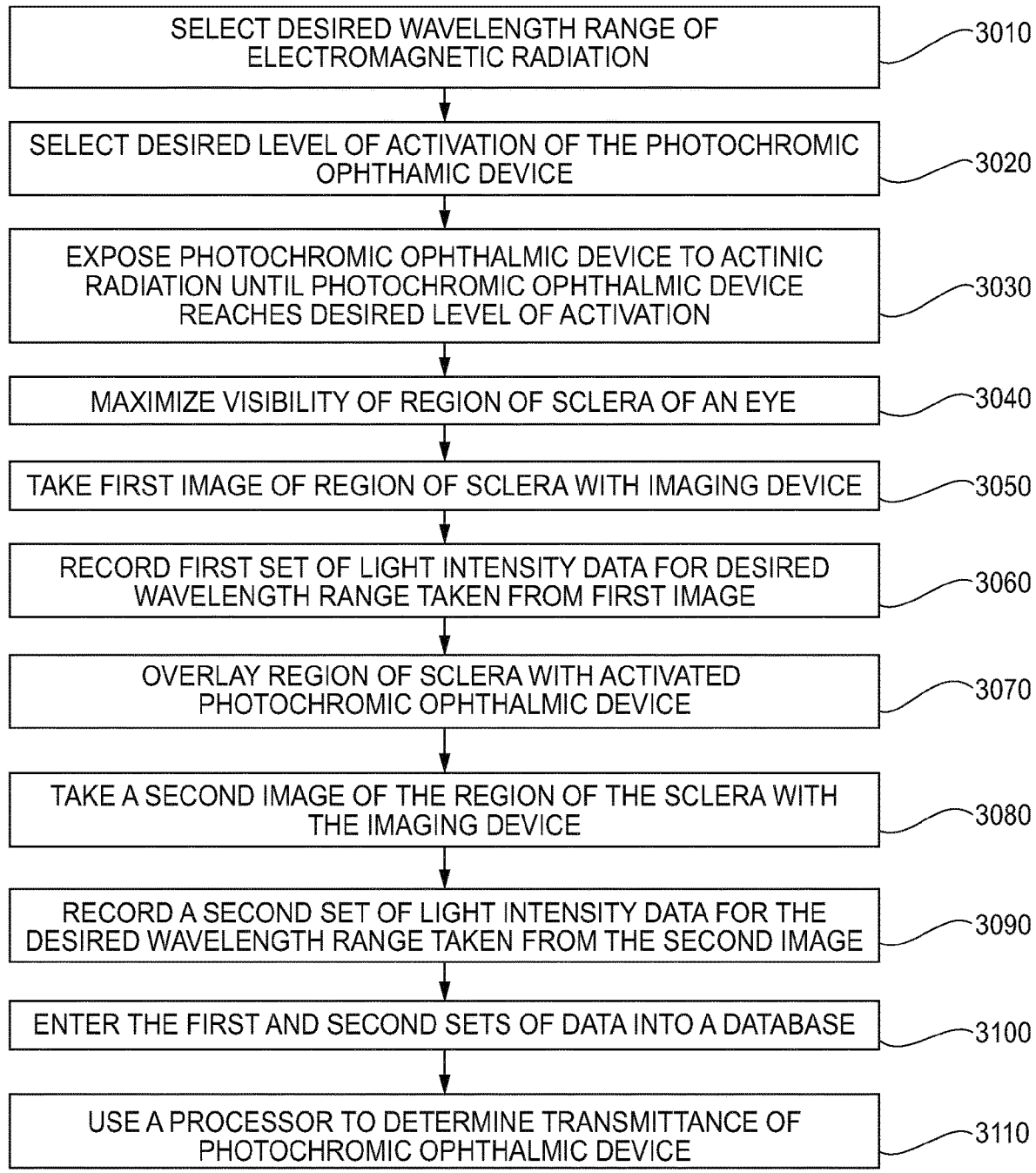
FIG. 8 is a block diagram of another exemplary measurement method of the invention.

FIG. 8 is a block diagram depicting steps of another exemplary method of the invention. Step 3010 includes selecting a desired wavelength range of electromagnetic radiation. Step 3020 includes selecting the desired level of activation of the ophthalmic device 200, preferably a photochromic ophthalmic device 200. Step 3030 includes exposing the photochromic ophthalmic device 200 to actinic radiation until the photochromic ophthalmic device 200 reaches the desired level of activation. Step 3040 includes maximizing visibility of a region 110 of a sclera 120 of an eye. Step 3050 includes taking a first image of the region 110 of the sclera 120 with an imaging device 400. The imaging device 400 may be configured to record electromagnetic radiation intensity data over the desired wavelength range. Step 3060 includes recording a first set of electromagnetic radiation intensity data for the desired wavelength range taken from the first image. Step 3070 includes overlaying the region 110 of the sclera 120 with the activated photochromic ophthalmic device 200. Step 3080 includes taking a second image of the region 110 of the sclera 120 overlaid with the photochromic ophthalmic device 200 with the imaging device 400. Step 3090 includes recording a second set of electromagnetic radiation intensity data for the desired wavelength range taken from the second image. Step 3100 includes entering the first and second sets of data into a database. Step 3110 includes using a processor to determine the transmittance of the photochromic ophthalmic device 200.

The invention according to the present disclosure may be further illustrated by the following examples. These examples do not limit the invention. They are meant only to suggest modes of practicing the invention. Those knowledgeable in optics as well as other specialties may find other modes of practicing the invention. However, those modes are to be deemed to be within the scope of this invention.

Example 1

Example 1 relates to the measurement of transmittance and absorbance of a photochromic contact lens in an outdoor environment.

Measurements according to the present invention were taken of an ophthalmic device on an ocular surface on an outdoor testing platform in full sun. The imaging device was an uncalibrated AVT camera set to an F-number of 8, and was white balanced. The photochromic ophthalmic device tested was a photochromic contact lens impregnated with a broad-band absorbing photochromic dye, and values in the Red, Green, and Blue planes still were obtainable. The ocular surface was a human eye. No RGB filter was applied to the lens of the camera. Because the photochromic dye in the subject lenses absorbed over a broad spectrum, an RGB filter was deemed unnecessary for the measurements according to this Example. Image data were analyzed using Igor Pro 6.37. The measured photochromic lens was activated on-eye for 20 minutes in ambient light prior to measurement. Transmittance values through the photochromic lens were determined based on the difference in intensity data between two images taken of the subject eye. Because transmission value was determined based on light reflected from the eye, the absorbance value was corrected by a factor of two, as described above. Intensity values were measured in "counts," which are units of scaled voltage. Prior to measurements, a dark value in the Red, Green, and Blue planes was determined.

The image data also included an area surrounding the subject eye, from which intensity data from a secondary location could be obtained, as described above. The secondary location was located off of the subject eye. Changes in ambient intensity between the two measurements were accounted for based on a percentage change in intensity data reflected from the secondary location, and a corrective multiplier was determined based on the inverse of this value. Intensity data from the secondary location are referred to as a third intensity measurement—which corresponds to image data taken at the time of the first intensity measurement from the contact lens—and as a fourth intensity measurement, which corresponds to image data taken at the time of the second intensity measurement of the contact lens. The values obtained are shown in Table 1, below. The "Corrective Transmittance" is the value for the Uncorrected Transmittance with the corrective multiplier applied. The "Corrected Absorbance" values were obtained from the Corrected Transmittance values, corrected by a factor of two, as described above.

TABLE 1

| Measurement of ophthalmic device | Raw intensity (counts) | Standard deviation (counts) | Uncorrected Transmittance | Corrected Transmittance | Corrected Absorbance |
|---|---|---|---|---|---|
| Red dark intensity | 16 | 11 | 0.45 | 0.46 | 0.17 |
| Red first intensity | 12555 | 2501 | | | |
| Red second intensity | 5600 | 833 | | | |
| Green dark value | 15 | 6 | 0.40 | 0.42 | 0.19 |
| Green first intensity | 9462 | 2547 | | | |
| Green second intensity | 3799 | 717 | | | |
| Blue Dark | 16 | 6 | 0.43 | 0.45 | 0.17 |
| Blue first intensity | 6980 | 2069 | | | |
| Blue second intensity | 3017 | 633 | | | |

| Measurement of secondary area | Raw intensity (counts) | Standard deviation (counts) | Secondary area intensity correction | Correction multiplier |
|---|---|---|---|---|
| Red Dark | 16 | 11 | 0.969 | 1.032 |
| Red third intensity | 11907 | 601 | | |
| Red fourth intensity | 11534 | 603 | | |
| Green Dark | 15 | 6 | 0.944 | 1.059 |
| Green third intensity | 7658 | 749 | | |
| Green fourth intensity | 7230 | 722 | | |
| Blue Dark | 16 | 6 | 0.961 | 1.041 |
| Blue third intensity | 5727 | 872 | | |
| Blue fourth intensity | 5503 | 788 | | |

Example 2

Example 2 relates to measuring transmittance of photochromic lenses and non-photochromic RGP contact lenses over a reference surface.

Generally according to this Example, a transparent culture cell was placed onto the white light LED backlight reference surface. The culture cell included multiple "pockets," into each of which a sample to be measured was placed. Image data were taken over all pockets simultaneously. Water preferably de-ionized water was added to one or more of the pockets in the culture cell.

For the non-photochromic lenses, a dark image and a reference image were taken, as described above. RGP lenses then are added to the pockets of the culture cell.

For photochromic lens samples according to this Example, the transparent culture cell was placed on the white LED backlit reference surface, and the photochromic contact lenses were added. Dark images and first images were taken. The photochromic lenses then were activated with a UV LED light source for about five minutes.

The photochromic lenses were activated, and a second set of image data was taken using an imaging device, and the transmittance and/or absorbance of the sample lenses was calculated. Because the photochromic lenses covered the reference surface during the first and second image measurements, the calculations according to the present Example are for a change in transmittance.

Specifically according to Example 2, an AVT F145C camera was used, equipped with a lens from Edmund Optics of Barrington, N.J. The lens was set to f/11 to provide a good depth of field, and focus was adjusted on the sample tray. The camera was mounted on an optical rail with the front end of the camera housing positioned 67.5 mm from the top of the backlit LED reference surface, and centered on the sample to be measured. AVT's SmartView software was used to adjust camera settings. In the SmartView software, the camera settings are set for F7 mode 0 for raw image collection. The exposure time was adjusted so that the light intensity was below 55,000 counts, but above 40,000 counts. "Counts" are a scaled unit of voltage. The number of averages was typically set to 4 and the output was set to RAW16. The white balance was allowed to automatically adjust until the values no longer changed, and then the white balance levels were turned off.

The photochromic lens samples were activated by five minutes of exposure to a "four-color" UV LED light source from Innovations in Optics, powered by a PP420 LED driver operated at about 12 V DC. The UV LED light source had relative emissions peaks at 367 nm, 386 nm, 406 nm, and 419 nm. After activation of the photochromic samples, the LED was moved out of position, and second image measurements were taken within five seconds of removing the UV LED light source. In order to control the UV LED output further, besides setting current and percent brightness values, an aperture from Newport was mounted directly in front of the UV LED optics to help cut down on the UV LED intensity in a uniform fashion.

Lighting of the reference surface was accomplished using a white light LED with diffuser from Edmund Optics set to maximum exposure. The backlighting of the reference surface was powered with a separate 24 V DC power supply. An MP-ICS intensity controller purchased from Edmund Optics was used to vary the backlight LED output, but this was set to maximum output due to the camera f-stop being set to f/11. The entire system was enclosed in a dark box to prevent stray light from interfering with the images. The front of the box was covered with black plastic material from ThorLabs, Inc. of Newton, N.J., to remove external stray light effects from room lighting, particularly for when the photochromic lens was activated. Data collection and data analysis were performed using an Igor Pro software package that used an interface for the Igor software developed by Bruxton Corp. of Seattle, Wash., to directly communicate with the AVT camera. The camera was connected to Igor Pro, then the exposure time was adjusted to ensure maximum signal without the images being off scale. The number of image averages was typically set to 4. The UV output of the UV LED light source was measured using an International Light Technologies ILT950 spectral radiometer.

Calculations of transmittance and absorption were made according to the disclosure above. With respect to the RGP lenses, reflectance was calculated based on Equation 4.67 (page 121) of Hecht, Optics, 4th Edition, and an estimated transmittance was determined. The Index of refraction of water was estimated to be 1.33. All indices of refraction were estimated at 589 nm, and the RGP lenses were assumed not to absorb visible light.

Additionally, the technique according to Example 2 has the advantage of allowing intensity data to be taken over multiple lenses at once, as data acquisition with the imaging device is simultaneous over all lenses in the array. The measurements according to Example 2 are recited in Table 2, below:

TABLE 2

| Sample lens | Absorbance in water | Transmittance in Water | 3*standard deviation | Estimated index of refraction | Calculated reflectance | Estimated transmittance |
|---|---|---|---|---|---|---|
| RGP lens A | 0.004 | 99.20 | 0.003 | 1.458 | 0.42 | 99.6 |
| RGP lens B | 0.004 | 99.00 | 0.004 | 1.469 | 0.49 | 99.5 |

| | Average central OD | Change in Transmission | 3* std. Dev. |
|---|---|---|---|
| Photochromic lens 1 | 0.63 | 23.6 | 0.01 |
| Photochromic lens 2 | 0.54 | 29.1 | 0.03 |
| Photochromic lens 3 | 0.68 | 21.0 | 0.02 |
| Photochromic lens 4 | 0.60 | 25.3 | 0.03 |

Example 3

Example 3 relates to measuring polarization of light according to the present invention.

Generally, Example 3 includes taking a plurality of image data of an environment through a linear polarizer set to various orientations, and determining the polarization of light from a region of interest ("ROI") of those image data, and/or the average polarization of the entire image. The polarization of light may be determined with respect to various portions of the environment depending on where the ROI is with respect to the image. For example, if the environment to be measured includes a sky, trees, and a lawn, then the separate polarization of light measured from the sky, trees, and/or lawn may be determined from the same set of image data.

While a linear polarizer was used in this Example, it is important to note that a circular polarizer may be used instead. A circular polarizer may be used if the linear polarizer portion is facing the object, and the quarter waveplate is facing the image detector. A circular polarizer may be preferable if the detector has a polarization bias, such as with a traditional high end DSLR camera.

Specifically according to Example 3, outdoor images were acquired using the Stingray 145C camera mounted on a rail and with an Edmund Optics zoom lens with aperture control: (Model No. M6Z 1212-3S, aperture range 12.5 mm to 75 mm). The lens aperture was set to 16, focus at 4.2 and zoom to 20 for all image acquisitions according to this Example. SmartView_110 software was set to a specific white balance, but auto balancing was turned off. The exposure was varied, depending upon the outdoor lighting conditions, the High Signal to Noise Ratio setting ("HSNR") was set to 4 images to average. The frames per second ("fps") was set to variable. The format was full pixel range, RAW 16. IS0800. The camera was hard mounted to a 100 mm rail with a polarizer in front. A bubble level was used to level the rail. Images were acquired with the presence of a Melles Griot ("MG") linear polarizer, which was mounted in a micrometer equipped rotation stage, oriented at 0, 90 and 45 degrees. The 0 degree setting was roughly horizontal +/−1 degree. A piece of black cloth was wrapped around the lens over the gap between the camera lens and the MG polarizer.

Images were taken in sets of five, which made it easier for general data acquisition. It also enabled the elimination poor images due to sudden movements. The polarizer was rotated between each image acquisition. The time base and/or exposure level was changed for each image in order to obtain good images of both high and low intensity regions of the image. Igor Pro software was used to analyze the images. The five images in each set were averaged, and the average image was used to calculate polarization values.

Image sets were taken at each orientation of the polarizer. The first image set was taken with a polarizer orientation at 0 degrees. The second set was taken with the polarizer set to an orientation of 45 degrees. The third set was taken with the polarizer set to an orientation of 90 degrees. Polarization values of the light reflected from the ROI of the images were determined by comparing the intensity data from the averaged images of the various polarizer orientations. Additionally, image sets were taken over three exposure times: 12 ms ("Low exposure"); 100 ms ("Medium exposure"); and 200 ms ("High exposure"). For this Example, image data in the green plane were analyzed. The polarization values obtained according to Example 3 are recited in Table 3, below.

TABLE 3

| Image set | Percentage partial polarization | Percentage error | Percentage of image with partial polarization |
|---|---|---|---|
| Low exposure | 15 | 4 | 28 |
| Medium exposure | 13.5 | 4 | 4 |
| High exposure | 19 | 7 | 17 |

Example 4

Example 4 relates to analyzing photochromic defects in a photochromic transparent article according to the present invention.

Generally, Example 4 includes taking intensity data of a photochromic ophthalmic device in a non-activated state, exposing the device to actinic radiation, and taking image data of the device an activated state. The photochromic device then undergoes fatiguing in order to produce defects. Image intensity data then are taken of the fatigued lens in a non-activated state and again in an activated state. The image intensity data are analyzed to identify photochromic defects in the fatigued lenses.

Specifically, image data were taken with a Stingray 145C camera. The camera was controlled using SmartView software. The camera was set up with white balance on. The exposure time was set for 8.8 milliseconds (ms) with 3 averages. Backlighting was accomplished with a white light LED from Edmund Optics, which was allowed to warm up for greater than 10 minutes before use. The camera's lens was an Edmund Optics model no. 59873, 50 mm F12.0 lens, which was set for optimal focus and aperture settings on the order of F/8 in order to obtain a good visual image. The camera's aperture and circular polarizer were removed for this Example. Room lights were mostly blocked with light blocking material. A dark image was collected using these settings and conditions.

A first image measurement was collected at these settings as well. The first image measurement was collected with the subject photochromic ophthalmic device in position, but unactivated, on the backlit reference surface.

The subject photochromic ophthalmic device was activated by exposure to UVA actinic radiation (385 nm) for about five minutes. The UVA light source was an LED system from Innovations in Optics, and was controlled using a Lambda LLS5008 power supply set to 0.6 amps and 3.03 V DC. The distance from the UVA light engine to the white light LED reference surface was 22.4 mm. The beam size from the UVA light source was 12 cm. The UVA light source was allowed to warm up for greater than 10 minutes before use.

The UVA light source was positioned in front of the subject photochromic ophthalmic device for 5 minutes of activation, then physically moved out of the way in order to take the second image of the activated photochromic device. The second measurement was taken less than five seconds after moving the UVA light source. Spectral irradiance was not collected.

Another set of first and second image measurements were taken after fatiguing the subject photochromic ophthalmic device. After fatigue, the experimental configuration was set up this same way to a reasonable approximation (3.03 V DC, 0.6 amps, etc.).

Samples were roughly visually aligned so that the labels were at the top of the image. While not performed in this specific example, samples may be tumbled in a tumbling system to produce additional fatiguing, or to remove an anti-reflective coating.

The analysis software was modified to collect and use the RGB image, and not just the Green portion of the image. Some image processing was done in Igor Pro in order to make the images viewable properly, such as scaling the images to 65535 counts—which is a scaled voltage value— counts to mimic a 16 bit output image, as the unprocessed images were 14 bit.

Because first images and second images according to Example 4 both include the ophthalmic device to be measured, strictly speaking, the transmittance values calculated really are a change in transmittance. Therefore, when references in Table 4 indicate that the photochromic ophthalmic device darkens to, for example, a 20% transmission, this refers to the darkness after removing the unactivated contribution to the transmission.

Figure 9:
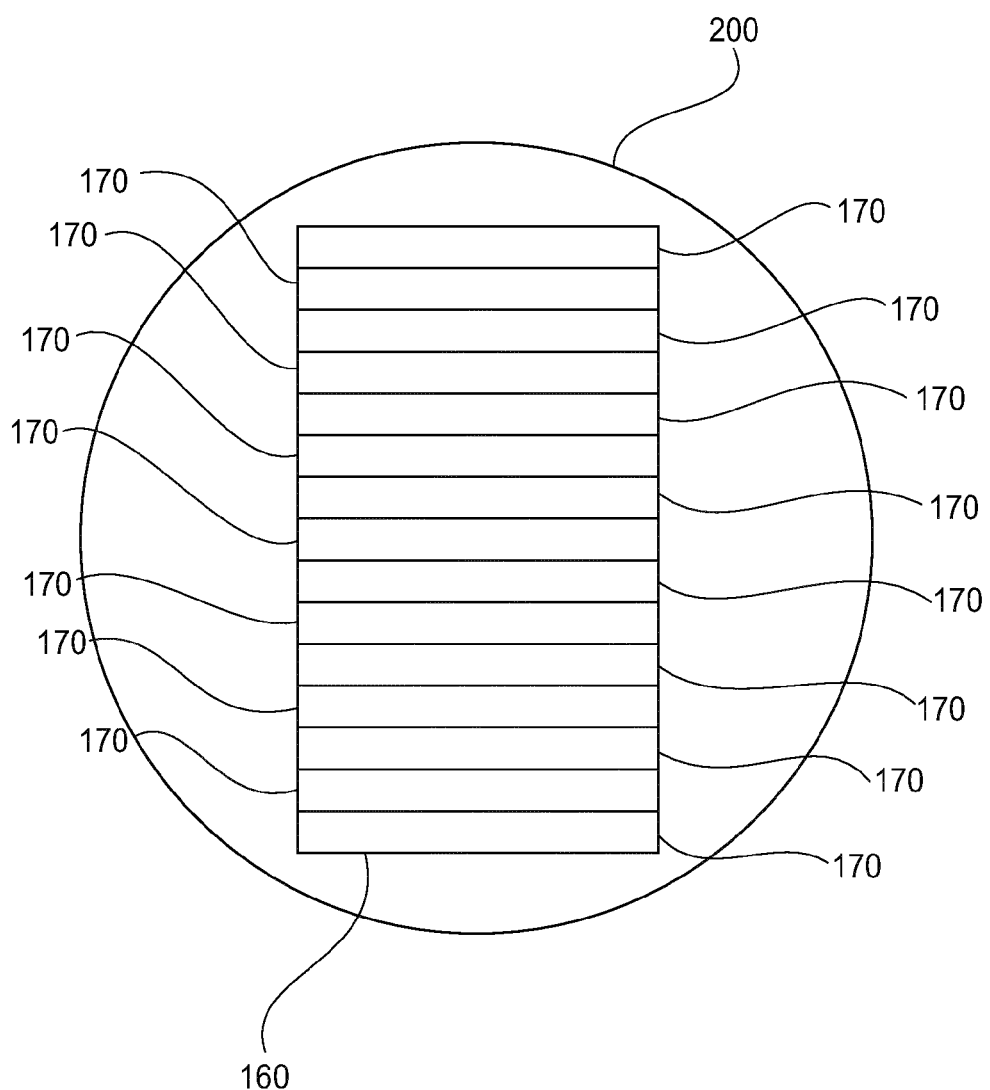
FIG. 9 is a schematic representation of an ophthalmic device defining a region of interest.

Data analysis was performed using Delta F calculations with squares on the order of 0.5 mm. These calculations were based on ISO 12311-2013, which is incorporated herein by reference. Portions of the areas of the squares overlapped with the areas of neighboring squares. As illustrated in FIG. 9, a region of interest, or ROI, 160 is defined on the subject photochromic ophthalmic device 200. The ROI 160 is further subdivided into sub regions, or rows, 170. Intensity data are analyzed and analyzed across each row 170.

In order to fatigue the subject ophthalmic devices, fatigue chambers were used. These were aluminum chambers with quartz windows and rubber gaskets applied with high vacuum grease to seal the chambers off. Two of the chambers stuck out further than the other, meaning that their direct exposure was slightly different than the other 4 chambers. All chambers were evacuated to −30" Hg and allowed to sit at vacuum for 1-3 minutes. All chambers were observed to hold vacuum under such short times. All chambers were pressurized with nitrogen to 10-14 psi and allowed to sit under pressure, closed off, for 30 seconds to 2 minutes. All chambers were observed to hold pressure for that period of time. All chambers were evacuated and filled to 10-14 psi with nitrogen and allowed to sit overnight. The chambers were then re-evacuated and then re-filled with nitrogen. The chambers were then placed outside for solar exposure. At 900 Watt hours of solar exposure, the chambers were brought back inside, evacuated, and back filled with nitrogen again. The chambers were placed back outside for an additional 900 Watt hours of solar exposure. The chambers were shown to hold pressure over 1 week. The chambers were checked after 1 week and again after 2 weeks, with an exchange of gases at the 1 week mark. At the end of each week, the chambers were shown to hold pressure to at least 8-12 psi above atmospheric pressure), which indicates that no significant leakage was present.

The subject ophthalmic device underwent 1813 Watt hours of UVA exposure in the fatigue chambers.

After fatiguing the sample ophthalmic device, image analysis was performed so that the data were analyzed over the same magnitude of absorbance range. Additionally, the photochromic ophthalmic device was measured with the polarizer at one position, and the photochromic ophthalmic device was oriented with an inscribed label oriented toward the top of the sample. However, this did not necessarily result in the exact same orientation between measurements.

By comparing intensity data taken in an unactivated state with intensity data taken in an activated state, one may cancel out non-photochromic defects in the subject ophthalmic device, and limit the analysis to photochromic defects only The absorbance values obtained according to Example 4 in the fatigued state are recited in Table 4, below. The Table shows data in the Green plane only, but it is to be understood that data may be taken and analyzed over the Red and Blue planes, or in other image formats, as well. Each line of data corresponds to its own row 170 of the ROI 160 of the image, as schematically represented in FIG. 9. As is demonstrated in the Table, image data according to the present invention may be analyzed on a pixel-by-pixel level, and thus photochromic properties of the subject transparent articles may be as well.

TABLE 4

| Delta F | Average Absorbance | Max. Absorbance | Min. Absorbance | Max-Min Absorbance | Number pixels per linear millimeter | Start pixels |
| --- | --- | --- | --- | --- | --- | --- |
| 2.7 | 1.203 | 1.228 | 1.195 | 0.033 | 14.4 | 18.6 |
| 2.5 | 1.202 | 1.224 | 1.193 | 0.031 | 14.4 | 19.6 |
| 2.6 | 1.2 | 1.22 | 1.188 | 0.032 | 14.4 | 20.6 |
| 3.2 | 1.198 | 1.222 | 1.183 | 0.039 | 14.4 | 21.6 |
| 3 | 1.196 | 1.218 | 1.182 | 0.036 | 14.4 | 22.6 |
| 3.1 | 1.194 | 1.217 | 1.179 | 0.038 | 14.4 | 23.6 |
| 3 | 1.193 | 1.217 | 1.18 | 0.037 | 14.4 | 24.6 |
| 2.8 | 1.191 | 1.215 | 1.181 | 0.034 | 14.4 | 25.6 |
| 3.3 | 1.189 | 1.213 | 1.173 | 0.04 | 14.4 | 26.6 |
| 3.1 | 1.188 | 1.213 | 1.175 | 0.038 | 14.4 | 27.6 |
| 2.8 | 1.187 | 1.211 | 1.177 | 0.034 | 14.4 | 28.6 |
| 3.1 | 1.185 | 1.209 | 1.172 | 0.037 | 14.4 | 29.6 |
| 3.5 | 1.183 | 1.207 | 1.165 | 0.042 | 14.4 | 30.6 |
| 3.6 | 1.183 | 1.206 | 1.163 | 0.043 | 14.4 | 31.6 |
| 3.9 | 1.182 | 1.205 | 1.158 | 0.047 | 14.4 | 32.6 |
| 3.2 | 1.182 | 1.204 | 1.166 | 0.038 | 14.4 | 33.6 |
| 2.7 | 1.183 | 1.202 | 1.169 | 0.033 | 14.4 | 34.6 |
| 2.6 | 1.183 | 1.203 | 1.172 | 0.031 | 14.4 | 35.6 |
| 2.4 | 1.183 | 1.203 | 1.174 | 0.029 | 14.4 | 36.6 |
| 2.5 | 1.183 | 1.203 | 1.173 | 0.03 | 14.4 | 37.6 |
| 2.6 | 1.183 | 1.205 | 1.174 | 0.031 | 14.4 | 38.6 |
| 2.6 | 1.184 | 1.205 | 1.174 | 0.031 | 14.4 | 39.6 |
| 2.4 | 1.184 | 1.205 | 1.176 | 0.029 | 14.4 | 40.6 |
| 2.3 | 1.185 | 1.204 | 1.176 | 0.028 | 14.4 | 41.6 |
| 2.4 | 1.187 | 1.207 | 1.178 | 0.029 | 14.4 | 42.6 |
| 2 | 1.189 | 1.206 | 1.182 | 0.024 | 14.4 | 43.6 |
| 2 | 1.19 | 1.206 | 1.182 | 0.024 | 14.4 | 44.6 |
| 2 | 1.191 | 1.208 | 1.184 | 0.024 | 14.4 | 45.6 |
| 2.3 | 1.193 | 1.212 | 1.184 | 0.028 | 14.4 | 46.6 |
| 2.1 | 1.196 | 1.215 | 1.189 | 0.026 | 14.4 | 47.6 |

TABLE 4-continued

| Delta F | Average Absorbance | Max. Absorbance | Min. Absorbance | Max-Min Absorbance | Number pixels per linear millimeter | Start pixels |
|---|---|---|---|---|---|---|
| 2.3 | 1.199 | 1.219 | 1.191 | 0.028 | 14.4 | 48.6 |
| 2.6 | 1.203 | 1.225 | 1.193 | 0.032 | 14.4 | 49.6 |
| 2.8 | 1.206 | 1.231 | 1.196 | 0.035 | 14.4 | 50.6 |

Example 5

Example 5 relates to analyzing the transmissivity of transparent articles having a gradient of absorption of light in a visible spectrum, such as gradient photochromic lenses.

Generally according to Example 5, image data were taken of a photochromic ophthalmic device which experienced a gradient of photochromic activation when exposed to actinic radiation. A first measurement was taken of an unactivated photochromic ophthalmic device. The device then was activated, and a second measurement was taken of the activated photochromic ophthalmic device. The intensity data were analyzed as described below. The photochromic ophthalmic device then underwent fatiguing, as described in detail in Example 4. As above, image data were taken in unactivated and activated states, and intensity data between the images were analyzed to determine an absorbance value. This method has the benefit of cancelling out non-photochromic defects, so that photochromic defects and gradient may be analyzed effectively.

Specifically, a Stingray 145C camera was set up with white balance on, auto set up in the SmartView software. The exposure time for each image was set for 18-20 ms with 4 averages. A dark image was collected with these settings. A first image was collected at these settings as well. The first image was collected with the unactivated photochromic ophthalmic device in position.

Backlighting was accomplished with a white light LED from Edmund Optics. The camera used a 50 mm, f/2.0 lens manufactured by Edmund Optics at model no. 59873. The lens was set for optimal focus and aperture settings (f/8.0) in order to obtain a good visual image. Room lights were mostly blocked with light blocking material. The camera's aperture and the circular polarizer were kept in place for this Example. The backlight source was allowed to warm up for more than 10 minutes before use.

The subject photochromic ophthalmic devices were activated by exposure for five minutes to a UV LED system from Innovations in Optics. The UV LED system was a "4 color" system which emitted UV light with relative emissions peaks at 365 nm, 385 nm, 405 nm, and 415 nm. The UV LED was controlled using a Gardasoft P420 driver. The values for the current, percent brightness, and actual current values for each LED in the UV LED system (~365 nm/~385 nm/~405 nm/and 415 nm) were as follows for each LED: 0.2/25%/0.04; 0.2/14%/0.01; 0.2/15%/0.02; and 0.3/45%/0.13, respectively. The distance from the UV LED light engine to the white light LED reference surface was 36 cm. The beam size of the UV LED source was 9.5 cm. In order to activate the photochromic ophthalmic device, the UV LED source was moved in front of the subject photochromic ophthalmic device for five minutes of activation, then physically moved out of the way in order to take the activated image. Activated images were taken within five seconds of removal of the UV LED source. Spectral Irradiance was collected with the UVA and UW values set to 6.8 and 19.8 W/m^2, respectively.

Samples were aligned visually with an inscribed name at the top of the ophthalmic device, in order to preserve orientation between measurements. However, this was not always the correct orientation such that the images had to be rotated after the fact during analysis in order to properly perform the gradient imaging.

Modifications were made to collect and use the RGB image and not just the portion of the image in the Green plane. The optical density images were processed as described above, and absorbance calculated: $Abs=\log(1/T)$, $T=(I_T-d)/(I_O-d)$. Some image processing was done in Igor Pro in order to make the images viewable properly, such as scaling the images to 65535 counts (a scaled measurement of voltage) to mimic a 16 bit output image. The actual images are 14 bit.

The transmissivity values calculated according to this example are, strictly speaking, a change in transmissivity because the unactivated state of the lens was used for the first measurement. Therefore, indications that the lens darkens to, for example, 20% transmissivity, actually refers to the darkness after removing the unactivated contribution to the transmissivity.

With the use of the RGB filter, the response of the individual RGB channels was changed enough that the green and blue responses could be off scale without the image showing red properly. To resolve this issue, the data acquisition software was changed to show all 3 color planes separately, with thresholding applied to all 3 images.

Data analysis was performed using Delta F calculations with squares on the order of 5 mm. The calculations were based upon ISO 12311-2013, which is incorporated herein by reference. Portions of the areas of the squares overlapped with the areas of neighboring squares.

As illustrated in FIG. 9, a region of interest, or ROI, 160 is defined on the subject photochromic ophthalmic device 200. The ROI 160 is further subdivided into sub regions, or rows, 170. Intensity data are analyzed and analyzed across each row 170. This is useful because ophthalmic devices 200 in the present Example experience a gradient of photochromic activation.

The absorbance values obtained according to Example 5 for an ophthalmic device with a photochromic gradient in an unfatigued state are recited in Table 5, below. The right-most column includes corrected data on Absorbance loss. The corrections relate to scaling problems that were not initially apparent when the image was taken, and were made according to methods known in the art.

TABLE 5

| | Delta F | Average T across row | Max T across row | Min T across row | Pixels per linear 5 mm | Start pixels | Ave. change in A | % A Loss | Corrected % A Loss |
|---|---|---|---|---|---|---|---|---|---|
| Red image response | 1.4 | 73.2 | 73.7 | 72.7 | 63.4 | 35.4 | 0.14 | 15% | 10% |
| | 1 | 70.7 | 71.1 | 70.4 | 63.4 | 40.4 | 0.15 | 15% | 11% |
| | 2.1 | 62.9 | 63.4 | 62.1 | 63.4 | 45.4 | 0.20 | 15% | 10% |
| | 4.1 | 50.6 | 51.3 | 49.2 | 63.4 | 50.4 | 0.30 | 17% | 12% |
| | 0.8 | 38.8 | 39 | 38.7 | 63.4 | 55.4 | 0.41 | 16% | 12% |
| | 0.7 | 28.3 | 28.4 | 28.2 | 63.4 | 60.4 | 0.55 | 15% | 10% |
| | 0.5 | 20.8 | 20.8 | 20.7 | 63.4 | 65.4 | 0.68 | 11% | 6% |
| | 2.9 | 16.9 | 17.1 | 16.6 | 63.4 | 70.4 | 0.77 | 9% | 4% |
| | 0 | 14.6 | 14.6 | 14.6 | 63.4 | 75.4 | 0.84 | 7% | 2% |
| | 0.7 | 14.1 | 14.2 | 14.1 | 63.4 | 80.4 | 0.85 | 7% | 2% |
| | 0.7 | 14.1 | 14.2 | 14.1 | 63.4 | 85.4 | 0.85 | 7% | 2% |
| | 0.7 | 14.4 | 14.4 | 14.3 | 63.4 | 90.4 | 0.84 | 7% | 2% |
| Green image response | 1.1 | 72.9 | 73.3 | 72.5 | 63.4 | 35.4 | 0.14 | 14% | 9% |
| | 1 | 70.4 | 70.8 | 70.1 | 63.4 | 40.4 | 0.15 | 14% | 9% |
| | 1.9 | 62.5 | 63 | 61.8 | 63.4 | 45.4 | 0.20 | 13% | 8% |
| | 3.9 | 50.1 | 50.8 | 48.8 | 63.4 | 50.4 | 0.30 | 14% | 9% |
| | 0.8 | 38.2 | 38.4 | 38.1 | 63.4 | 55.4 | 0.42 | 13% | 8% |
| | 0.7 | 27.8 | 27.9 | 27.7 | 63.4 | 60.4 | 0.56 | 11% | 6% |
| | 1 | 20.3 | 20.4 | 20.2 | 63.4 | 65.4 | 0.69 | 8% | 3% |
| | 3.6 | 16.4 | 16.7 | 16.1 | 63.4 | 70.4 | 0.79 | 6% | 0% |
| | 0.7 | 14.2 | 14.3 | 14.2 | 63.4 | 75.4 | 0.85 | 5% | −1% |
| | 0.7 | 13.7 | 13.8 | 13.7 | 63.4 | 80.4 | 0.86 | 5% | −1% |
| | 0.7 | 13.7 | 13.8 | 13.7 | 63.4 | 85.4 | 0.86 | 5% | −1% |
| | 0.7 | 13.9 | 13.9 | 13.8 | 63.4 | 90.4 | 0.86 | 5% | −1% |
| Blue image response | 1.1 | 72.1 | 72.6 | 71.8 | 63.4 | 35.4 | 0.14 | 14% | 10% |
| | 0.9 | 69.6 | 70 | 69.4 | 63.4 | 40.4 | 0.16 | 14% | 9% |
| | 1.9 | 61.6 | 62.1 | 60.9 | 63.4 | 45.4 | 0.21 | 13% | 8% |
| | 3.8 | 49 | 49.7 | 47.8 | 63.4 | 50.4 | 0.31 | 14% | 9% |
| | 0.8 | 37.1 | 37.2 | 36.9 | 63.4 | 55.4 | 0.43 | 13% | 8% |
| | 1.5 | 26.8 | 27 | 26.6 | 63.4 | 60.4 | 0.57 | 10% | 5% |
| | 1 | 19.5 | 19.6 | 19.4 | 63.4 | 65.4 | 0.71 | 7% | 2% |
| | 3.7 | 15.8 | 16.1 | 15.5 | 63.4 | 70.4 | 0.80 | 5% | −1% |
| | 1.4 | 13.7 | 13.8 | 13.6 | 63.4 | 75.4 | 0.86 | 4% | −1% |
| | 0 | 13.3 | 13.3 | 13.3 | 63.4 | 80.4 | 0.88 | 4% | −2% |
| | 0.8 | 13.3 | 13.3 | 13.2 | 63.4 | 85.4 | 0.88 | 4% | −1% |
| | 0.7 | 13.5 | 13.5 | 13.4 | 63.4 | 90.4 | 0.87 | 5% | −1% |

Table 6 shows gradient defect data for the same sample after it had undergone a fatigue cycle. Generally, the difference between the measurements over a set of subject photochromic devices was 6%. Therefore a 6% correction was applied.

TABLE 6

| | Delta F | Average T across row | Max T across row | Min T across row | Min/Max Difference | pixels/ 5 mm | Start Pixels | Ave. change in A |
|---|---|---|---|---|---|---|---|---|
| Red image response | 1.2 | 76.7 | 77.2 | 76.3 | 0.9 | 63.1 | 34.1 | 0.12 |
| | 0.7 | 74.6 | 74.8 | 74.3 | 0.5 | 63.1 | 39.1 | 0.13 |
| | 2.5 | 67.5 | 68.1 | 66.4 | 1.7 | 63.1 | 44.1 | 0.17 |
| | 3.7 | 56.7 | 57.4 | 55.3 | 2.1 | 63.1 | 49.1 | 0.25 |
| | 2 | 45.3 | 45.7 | 44.8 | 0.9 | 63.1 | 54.1 | 0.34 |
| | 2 | 34 | 34.3 | 33.6 | 0.7 | 63.1 | 59.1 | 0.47 |
| | 1.6 | 24.9 | 25 | 24.6 | 0.4 | 63.1 | 64.1 | 0.60 |
| | 2.5 | 19.8 | 20 | 19.5 | 0.5 | 63.1 | 69.1 | 0.70 |
| | 0.6 | 16.8 | 16.9 | 16.8 | 0.1 | 63.1 | 74.1 | 0.77 |
| | 0.6 | 16.3 | 16.3 | 16.2 | 0.1 | 63.1 | 79.1 | 0.79 |
| | 0.6 | 16.2 | 16.3 | 16.2 | 0.1 | 63.1 | 84.1 | 0.79 |
| | 0.6 | 16.5 | 16.6 | 16.5 | 0.1 | 63.1 | 89.1 | 0.78 |
| Green image response | 1 | 76.2 | 76.7 | 75.9 | 0.8 | 63.1 | 34.1 | 0.12 |
| | 0.5 | 73.9 | 74.1 | 73.7 | 0.4 | 63.1 | 39.1 | 0.13 |
| | 2.8 | 66.5 | 67.2 | 65.3 | 1.9 | 63.1 | 44.1 | 0.18 |
| | 4.1 | 55.2 | 56 | 53.7 | 2.3 | 63.1 | 49.1 | 0.26 |
| | 2.1 | 43.4 | 43.7 | 42.8 | 0.9 | 63.1 | 54.1 | 0.36 |
| | 2.5 | 31.9 | 32.3 | 31.5 | 0.8 | 63.1 | 59.1 | 0.50 |
| | 1.3 | 23 | 23.1 | 22.8 | 0.3 | 63.1 | 64.1 | 0.64 |
| | 2.2 | 18.2 | 18.4 | 18 | 0.4 | 63.1 | 69.1 | 0.74 |
| | 0.6 | 15.6 | 15.6 | 15.5 | 0.1 | 63.1 | 74.1 | 0.81 |

TABLE 6-continued

|  | Delta F | Average T across row | Max T across row | Min T across row | Min/Max Difference | pixels/ 5 mm | Start Pixels | Ave. change in A |
|---|---|---|---|---|---|---|---|---|
|  | 0.7 | 15 | 15.1 | 15 | 0.1 | 63.1 | 79.1 | 0.82 |
|  | 0.7 | 15.1 | 15.1 | 15 | 0.1 | 63.1 | 84.1 | 0.82 |
|  | 0.6 | 15.3 | 15.4 | 15.3 | 0.1 | 63.1 | 89.1 | 0.82 |
| Blue | 1.2 | 75.6 | 76.1 | 75.2 | 0.9 | 63.1 | 34.1 | 0.12 |
| image | 0.7 | 73.3 | 73.5 | 73 | 0.5 | 63.1 | 39.1 | 0.13 |
| response | 3 | 65.6 | 66.4 | 64.4 | 2 | 63.1 | 44.1 | 0.18 |
|  | 4.4 | 54 | 54.9 | 52.5 | 2.4 | 63.1 | 49.1 | 0.27 |
|  | 2.4 | 42.1 | 42.5 | 41.5 | 1 | 63.1 | 54.1 | 0.38 |
|  | 3.2 | 30.6 | 31.2 | 30.2 | 1 | 63.1 | 59.1 | 0.51 |
|  | 1.8 | 22 | 22.1 | 21.7 | 0.4 | 63.1 | 64.1 | 0.66 |
|  | 1.7 | 17.3 | 17.5 | 17.2 | 0.3 | 63.1 | 69.1 | 0.76 |
|  | 0.7 | 14.9 | 14.9 | 14.8 | 0.1 | 63.1 | 74.1 | 0.83 |
|  | 0.7 | 14.4 | 14.5 | 14.4 | 0.1 | 63.1 | 79.1 | 0.84 |
|  | 0.7 | 14.5 | 14.6 | 14.5 | 0.1 | 63.1 | 84.1 | 0.84 |
|  | 1.3 | 14.8 | 14.9 | 14.7 | 0.2 | 63.1 | 89.1 | 0.83 |

The invention further may be characterized by one or more of the following clauses.

Clause 1: A method for determining a transmittance of electromagnetic radiation through a transparent article 250 comprises: measuring a first intensity of radiation reflected or emitted by at least a portion of a reference surface 80; positioning a transparent article 250 over or covering at least a portion of the reference surface 80; measuring a second intensity of radiation transmitted through the transparent article 250 that is reflected or emitted by at least one region 110 of the reference surface 80 that is overlaid or covered by the transparent article 250; and calculating a transmittance of electromagnetic radiation through the transparent article (250) using the measurements of the first intensity and the second intensity.

Clause 2: The method of clause 1, wherein the measuring steps are accomplished with an intensity measuring device 400, preferably an imaging device.

Clause 3: The method of clause 2, wherein the second intensity of radiation is reflected by a region 110 of the reference surface 80, and which further comprises: determining an intensity value attributable to dark current on the intensity measuring device 400; and calculating the transmittance of electromagnetic radiation through the transparent article 250 according to the following equation:

$$T_{Corr} = \frac{1}{\sqrt{\frac{I_O - d}{I_T - d}}},$$

where $T_{Corr}$ is the transmittance of electromagnetic radiation through the transparent article 250; $I_O$ is the measurement of the first intensity; $I_T$ is the measurement of the second intensity; and d is the intensity value attributable to dark current on the intensity measuring device 400.

Clause 4: The method of clause 2, wherein the second intensity of radiation is emitted by the reference surface 80, and which further comprises: determining an intensity value attributable to dark current on the intensity measuring device 400; and calculating the transmittance of electromagnetic radiation through the transparent article 250 according to the following equation:

$$T_{Meas} = \frac{(I_T - d)}{(I_O - d)},$$

where $T_{Meas}$ is the transmittance of electromagnetic radiation through the transparent article 250; $I_O$ is the measurement of the first intensity; $I_T$ is the measurement of the second intensity; and d is the intensity value attributable to dark current on the intensity measuring device 400.

Clause 5: The method of any of clauses 1 to 4, further comprising: measuring the first intensity at a first location of the reference surface 80; and measuring the second intensity at the first location of the reference surface 80.

Clause 6: The method of clause 5, further comprising: measuring a third intensity of radiation reflected or emitted from a secondary location 150 contemporaneously with measuring the first intensity, wherein the at least one region 110 is different than the secondary location 150; measuring a fourth intensity of radiation reflected or emitted from the secondary location 150 contemporaneously with measuring the second intensity; comparing the third intensity to the fourth intensity to determine a change in intensity of radiation between times of measurement of the first and third intensities and the second and fourth intensities; and compensating for the change in intensity of radiation between times of measurement of the first and third intensities and the second and fourth intensities in the calculation of the transmittance of electromagnetic radiation through the transparent article 250 using the comparison between the third and fourth intensities.

Clause 7: The method of any of clauses 2 to 6, wherein the intensity measuring device 400 is configured to measure intensity of electromagnetic radiation within a spectrum of electromagnetic radiation comprising a wavelength range of 1 nm to 1,000 nm, preferably 380-780 nm.

Clause 8: The method of any of clauses 2 to 7, wherein the intensity measuring device 400 is configured to measure intensity of electromagnetic radiation over a spectrum of electromagnetic radiation comprising a wavelength range of 460±20 nm.

Clause 9: The method of any of clauses 2 to 8, wherein the intensity measuring device 400 is configured to measure intensity of electromagnetic radiation over a spectrum of electromagnetic radiation comprising a wavelength range of 555±20 nm.

Clause 10: The method of any of clauses 2 to 9, wherein the intensity measuring device 400 is configured to measure intensity of electromagnetic radiation over a spectrum of electromagnetic radiation comprising a wavelength range of 635±20 nm.

Clause 11: The method of any of clauses 1 to 10, wherein the measurements of the first and second intensities are from a range of wavelengths selected from the group consisting of 460±20 nm, 555±20 nm, and 635±20 nm.

Clause 12: The method of any of clauses 2 to 11, further comprising applying a filter 450 over a detector of the intensity measuring device 400 prior to measuring the first and second intensities.

Clause 13: The method of clause 12, wherein the filter 450 is centered on a wavelength selected from the group consisting of 460±20 nm, 555±20 nm, and 635±20 nm.

Clause 14: The method of clauses 11 or 12, wherein the filter 450 is a three-wavelength notch filter.

Clause 15: The method of any of clauses 1 to 14, wherein the reference surface 80 is an ocular surface 100 comprising a three-dimensional representation of a human eye.

Clause 16: The method of any of clauses 1 to 14, wherein the reference surface 80 is an ocular surface 100 comprising a human eye.

Clause 17: The method of clauses 15 or 16, wherein the ocular surface 100 comprises at least a portion of a sclera of the eye.

Clause 18: The method of clause 17, further comprising measuring the value of the second intensity over a central portion or a peripheral portion of the ophthalmic device 200.

Clause 19: A method for determining a transmittance of a photochromic ophthalmic device 200 at a desired level of activation, comprises selecting the desired wavelength range of electromagnetic radiation; selecting a desired level of activation of the photochromic ophthalmic device 200; exposing the photochromic ophthalmic device 200 to actinic radiation until the photochromic ophthalmic device 200 reaches the desired level of activation; maximizing visibility of a region 110 of a sclera 120 of an eye; taking a first image of the region 110 of the sclera 120 with an imaging device 400, wherein the imaging device 400 is configured to record electromagnetic radiation intensity data over the desired wavelength range; recording a first set of electromagnetic radiation intensity data for the desired wavelength range taken from the first image; covering the region 110 of the sclera 120 with the activated photochromic ophthalmic device 200; taking a second image of the region 110 of the sclera 120 with the imaging device; recording a second set of electromagnetic radiation intensity data for the desired wavelength range taken from the second image; entering the first and second sets of data into a database; and using a processor to determine the transmittance of the photochromic ophthalmic device 200.

Clause 20: The method of clause 19, further comprising applying a filter 450 over the imaging device 400 prior to taking the first and second images.

Clause 21: The method of clause 20, wherein the filter 450 is centered on a wavelength selected from the group consisting of 460±20 nm, 555±20 nm, and 635±20 nm.

Clause 22: The method of clauses 20 or 21, wherein the filter 450 is a three-wavelength notch filter.

Clause 23: A method for determining the transmittance of electromagnetic radiation through an ophthalmic device 200 comprises: positioning a non-activated ophthalmic device 200 over a portion of an ocular surface 100; measuring a first intensity of radiation reflected by a region 110 of the ocular surface 100 overlaid by the ophthalmic device 200; activating the ophthalmic device 200; measuring a second intensity of radiation reflected by a region 110 of the ophthalmic device 200 that is overlaid by the ophthalmic device 200; and calculating the transmittance of electromagnetic radiation through the ophthalmic device 200 using the measurements of the first intensity and the second intensity.

Clause 24: A method for determining the transmittance of electromagnetic radiation through a transparent article 250 comprises: measuring a first intensity of radiation reflected or emitted by a region 110 of a reference surface 80 overlaid by an activated transparent article 250; measuring a second intensity of radiation reflected or emitted by a region of the reference surface 80 that is not overlaid by the transparent article 250; converting the first and second measurements to CIE color coordinates; and calculating the transmittance of electromagnetic radiation through the transparent article 250 using the difference in the CIE color coordinates.

Clause 25: The method of any of clauses 1 to 24, wherein the transparent article 250 is in direct contact with the reference surface 80.

Clause 26: The method of clause 1, wherein the transparent article 250 is positioned over the reference surface 80 before measuring the first and second intensities, wherein the measurements of the first intensity and the second intensity are taken from a same image, wherein the first intensity is measured from a portion of the reference surface 80 that is not covered by the transparent article 250, wherein the second intensity is measured from a portion of the reference surface 80 that is covered by the transparent article 250, and the method further comprises: converting the measurement of the first intensity to CIE XYZ values; converting the measurement of the second intensity to CIE XYZ values; and determining the transmittance according to the following equation:

$$T_Y = \log_{10}\left(\frac{Y_{uncovered}}{Y_{above}}\right),$$

where $T_Y$ is the transmittance of the transparent article 250 determined according to CIE Y values, $Y_{uncovered}$ is a Y value of the portion of the image of the reference surface 80 when the reference surface 80 is not covered or overlaid by the transparent article 250, and $Y_{above}$ is a Y value of the portion of the image of the reference surface when the reference surface 80 is overlaid by the transparent article 250.

Clause 27: A measurement system 10, 20, 30 for determining a transmittance of a photochromic transparent article 250 comprises a light source 300 and an intensity measuring device 400.

Clause 28: The measurement system 10, 20, 30 of clause 27, further including a reference surface 80.

Clause 29: The measurement system 10, 20, 30 of clauses 27 or 28, wherein the light source 300 is a natural light source or an artificial light source.

Clause 30: The measurement system 10, 20, 30 of any of clauses 27 to 29, wherein the intensity measuring device 400 comprises an imaging device.

Clause 31: The measurement system 10, 20, 30 of any of clauses 27 to 30, wherein the intensity measuring device 400 is configured to measure intensity of radiation over a spectrum of electromagnetic radiation comprising a wavelength range of 380-780 nm.

Clause 32: The measurement system 10, 20, 30 of any of clauses 27 to 31, wherein the intensity measuring device 400 is configured to measure intensity of radiation over a spectrum of electromagnetic radiation comprising a wavelength range of 460±20 nm.

Clause 33: The measurement system 10, 20, 30 of any of clauses 27 to 32, wherein the intensity measuring device 400 is configured to measure intensity of radiation over a spectrum of electromagnetic radiation comprising a wavelength range of 555±20 nm.

Clause 34: The measurement system 10, 20, 30 of any of clauses 27 to 33, wherein the intensity measuring device 400 is configured to measure intensity of radiation over a spectrum of electromagnetic radiation comprising a wavelength range of 635±20 nm.

Clause 35: The measurement system 10, 20, 30 of any of clauses 27 to 34, further comprising a filter 450 over a detector of the intensity measuring device 400.

Clause 36: The measurement system 10, 20, 30 of clause 35, wherein the filter 450 is centered on a wavelength selected from the group consisting of 460±20 nm, 555±20 nm, and 635±20 nm.

Clause 37: The measurement system 10, 20, 30 of clauses 35 or 36, wherein the filter 450 is a three-wavelength notch filter.

Clause 38: The measurement system 10, 20, 30 of any of clauses 28 to 37, wherein the reference surface 80 is an ocular surface 100 comprising a three-dimensional representation of a human eye.

Clause 39: The measurement system 10, 20, 30 of any of clauses 28 to 37, wherein the reference surface is an ocular surface 100 comprising a human eye.

Clause 40: The method of any of clauses 1 to 18, wherein the transparent article 250 is a photochromic ophthalmic device 200, preferably a photochromic RGP contact lens, and the method includes at least partly activating the photochromic ophthalmic device 200 between measuring the first intensity and measuring the second intensity.

Although the disclosure has been described in detail for the purpose of illustration based on what are currently considered to be the most practical and preferred aspects, it is to be understood that such detail is solely for that purpose and that the disclosure is not limited to the disclosed aspects, but is intended to cover modifications and equivalent arrangements. For example, it is to be understood that the present disclosure contemplates that, to the extent possible, one or more features of any aspect can be combined with one or more features of any other aspect.

The invention claimed is:

1. A method for determining a transmittance of electromagnetic radiation through a transparent article, comprising:
   measuring a first intensity of radiation reflected or emitted by at least a portion of a reference surface with an intensity measuring device;
   positioning a transparent article over at least a portion of the reference surface;
   measuring a second intensity of radiation transmitted through the transparent article that is reflected or emitted by at least one region of the reference surface that is overlaid by the transparent article with the intensity measuring device; and
   calculating a transmittance of electromagnetic radiation through the transparent article using the measurements of the first intensity and the second intensity,
   wherein when the second intensity of radiation is reflected by the region of the reference surface, the method further comprises:
   determining an intensity value attributable to dark current on the intensity measuring device; and
   calculating the transmittance of electromagnetic radiation through the transparent article according to the following equation:

$$T_{Corr} = \frac{1}{\sqrt{\frac{I_O - d}{I_T - d}}}$$

where:
$T_{Corr}$ is the transmittance of electromagnetic radiation through the transparent article;
$I_O$ is the measurement of the first intensity;
$I_T$ is the measurement of the second intensity; and
d is the intensity value attributable to dark current on the intensity measuring device; or
wherein when the second intensity of radiation is emitted by the reference surface, the method further comprises:
determining an intensity value attributable to dark current on the intensity measuring device; and
calculating the transmittance of electromagnetic radiation through the transparent article according to the following equation:

$$T_{Meas} = \frac{(I_T - d)}{(I_O - d)}$$

where
$T_{Meas}$ is the transmittance of electromagnetic radiation through the transparent article;
$I_O$ is the measurement of the first intensity;
$I_T$ is the measurement of the second intensity; and
d is the intensity value attributable to dark current on the intensity measuring device.

2. The method according to claim 1, further comprising:
   measuring a third intensity of radiation reflected or emitted from a secondary location contemporaneously with measuring the first intensity, wherein the at least one region is different than the secondary location;
   measuring a fourth intensity of radiation reflected or emitted from the secondary location contemporaneously with measuring the second intensity;
   comparing the third intensity to the fourth intensity to determine a change in intensity of radiation between times of measurement of the first and third intensities and the second and fourth intensities; and
   compensating for the change in intensity of radiation between times of measurement of the first and third intensities and the second and fourth intensities in the calculation of the transmittance of electromagnetic radiation through the transparent article using the comparison between the third and fourth intensities.

3. The method according to claim 1, wherein the intensity measuring device is configured to measure intensity of electromagnetic radiation within a spectrum of electromagnetic radiation comprising a wavelength range of 1 nm to 1,000 nm.

4. The method according to claim 1, wherein the intensity measuring device is configured to measure intensity of electromagnetic radiation over a spectrum of electromagnetic radiation comprising a wavelength range of 460±20 nm.

5. The method according to claim 1, wherein the intensity measuring device is configured to measure intensity of electromagnetic radiation over a spectrum of electromagnetic radiation comprising a wavelength range of 555±20 nm.

6. The method according to claim 1, wherein the intensity measuring device is configured to measure intensity of electromagnetic radiation over a spectrum of electromagnetic radiation comprising a wavelength range of 635±20 nm.

7. The method according to claim 1, wherein the measurements of the first and second intensities are from a range of wavelengths selected from the group consisting of 460±20 nm, 555±20 nm, and 635±20 nm.

8. The method according to claim 1, further comprising:
applying a filter over a detector of the intensity measuring device prior to measuring the first and second intensities.

9. The method according to claim 8, wherein the filter is centered on a wavelength selected from the group consisting of 460±20 nm, 555±20 nm, and 635±20 nm.

10. The method according to claim 1, wherein the reference surface is an ocular surface comprising at least a portion of a human eye and the transparent article is positioned over the ocular surface.

11. The method according to claim 10, further comprising:
measuring the value of the second intensity over a substantially central portion or a peripheral portion of the transparent article.

12. The method according to claim 1, wherein the transparent article is a photochromic transparent article and the method comprises:
selecting a desired wavelength range of electromagnetic radiation;
selecting a desired level of activation of the photochromic transparent article; and
exposing the photochromic transparent article to actinic radiation until the photochromic transparent article reaches the desired level of activation, wherein the reference surface is an ocular surface comprising an eye, wherein the at least one region is located on a sclera of the eye, wherein the intensity measuring device is an imaging device configured to record electromagnetic radiation intensity data over the desired wavelength range, wherein measuring the first intensity of radiation reflected by the ocular surface with the intensity measuring device comprises taking a first image of the region of the sclera with the imaging device, wherein positioning the photochromic transparent article over the ocular surface comprises overlaying the region of the sclera with the activated photochromic transparent article, wherein measuring the second intensity of radiation reflected by the region of the ocular surface that is overlaid by the photochromic transparent article with the intensity measuring device comprises maximizing visibility of the region of the sclera, and taking a second image of the region of the sclera with the imaging device, and
wherein calculating the transmittance of electromagnetic radiation through the photochromic transparent article using the measurements of the first intensity and the second intensity comprises:
recording a first set of electromagnetic radiation intensity data for the desired wavelength range taken from the first image;
recording a second set of electromagnetic radiation intensity data for the desired wavelength range taken from the second image;
entering the first and second sets of data into a database; and
using a processor to determine the transmittance of electromagnetic radiation through the photochromic transparent article.

13. The method according to claim 1, wherein the transparent article is positioned over the reference surface before measuring the first and second intensities, wherein the measurements of the first intensity and the second intensity are taken from a same image, wherein the first intensity is measured from a portion of the reference surface that is not overlaid by the transparent article, wherein the second intensity is measured from a portion of the reference surface that is overlaid by the transparent article, and the method further comprises:
converting the measurement of the first intensity to CIE XYZ values;
converting the measurement of the second intensity to CIE XYZ values; and
determining the transmittance according to the following equation:

$$T_Y = \log_{10}\left(\frac{Y_{uncovered}}{Y_{above}}\right)$$

where:
$T_Y$ is the transmittance of the transparent article determined according to CIE Y values;
$Y_{uncovered}$ is a Y value of the portion of the image of the reference surface, wherein the reference surface is not overlaid by the transparent article; and
$Y_{above}$ is a Y value of the portion of the image of the reference surface, wherein the reference surface is overlaid by the transparent article.

14. The method according to claim 1, wherein the intensity measuring device is configured to measure intensity of electromagnetic radiation within a spectrum of electromagnetic radiation comprising a wavelength range of 380-780 nm.

15. The method according to claim 8, wherein the filter comprises a three-wavelength notch filter.

16. The method according to claim 10, wherein the ocular surface comprises at least a portion of a sclera of the eye.

* * * * *